United States Patent
Tomaru et al.

(10) Patent No.: US 11,341,425 B2
(45) Date of Patent: May 24, 2022

(54) COMPUTING APPARATUS INCORPORATING QUANTUM EFFECTS THAT PERFORMS HIGH-SPEED COMPUTATION ON INVERSE PROBLEMS OR COMPUTATIONAL OPTIMIZATION PROBLEMS REQUIRING EXHAUSTIVE SEARCH

(71) Applicant: HITACHI, LTD., Tokyo (JP)

(72) Inventors: Tatsuya Tomaru, Tokyo (JP); Kenzo Kurotsuchi, Tokyo (JP)

(73) Assignee: HITACHI LTD., Tokyo (JP)

( * ) Notice: Subject to any disclaimer, the term of this patent is extended or adjusted under 35 U.S.C. 154(b) by 1013 days.

(21) Appl. No.: 15/578,812

(22) PCT Filed: Jun. 5, 2015

(86) PCT No.: PCT/JP2015/066324
§ 371 (c)(1),
(2) Date: Sep. 7, 2018

(87) PCT Pub. No.: WO2016/194221
PCT Pub. Date: Dec. 8, 2016

(65) Prior Publication Data
US 2018/0373995 A1  Dec. 27, 2018

(51) Int. Cl.
*G06N 10/00* (2022.01)
*G06N 5/00* (2006.01)
(Continued)

(52) U.S. Cl.
CPC .......... *G06N 10/00* (2019.01); *G06F 9/3816* (2013.01); *G06F 17/12* (2013.01); *G06N 5/003* (2013.01)

(58) Field of Classification Search
CPC ...... G06N 10/00; G06N 5/003; G06F 9/3816; G06F 17/12
See application file for complete search history.

(56) References Cited

U.S. PATENT DOCUMENTS

2007/0080341 A1   4/2007   Macready et al.
2007/0180586 A1   8/2007   Amin

FOREIGN PATENT DOCUMENTS

JP   2009-524857 A   7/2009
WO   WO 2007/006144 A1   1/2007

OTHER PUBLICATIONS

Tomaru, "Quasi-Adiabatic Quantum Computing Treated with c-Numbers Using the Local Field Response," in 85 J. Physical Soc'y Japan 034802 (2016). (Year: 2016).*

(Continued)

*Primary Examiner* — Kamran Afshar
*Assistant Examiner* — Ryan C Vaughn
(74) *Attorney, Agent, or Firm* — Baker Botts L.L.P.

(57) ABSTRACT

A computing apparatus that does not need quantum coherence or a cryogenic cooling apparatus is provided for assignments that need an exhaustive search. A system is led to the ground state of the system where a problem is set, wherein spin $s_j^z$ that is a variable follows a local effective magnetic field $B_j^z$. The spin state at t=0 is initialized with a transverse field (in the x-direction). This corresponds to $s_j^z=0$. With time t, the magnetic field in the z-axis direction and the inter-spin interactions are gradually added, and finally the spin is directed to the +z- or −z-direction. The z component of the spin $s_j$ is $s_j^z=+1$ or −1. Here, in the process where the orientation of the spin $s_j^z$ follows that of the effective magnetic field $B_j^z$, correction parameters originating in quantum-mechanical effects are introduced and ground-state-maintaining performance is improved.

15 Claims, 12 Drawing Sheets

(51) Int. Cl.
  G06F 9/38 (2018.01)
  G06F 17/12 (2006.01)

(56) References Cited

OTHER PUBLICATIONS

Tomaru, "Improved Local Field Response Method Working as Quasi-Quantum Annealing," in 86 J. Physical Soc'y Japan 054801 (2017). (Year: 2017).*
Yoshimura et al., "Uncertain Behaviors of Integrated Circuits Improve Computational Performance," in 5(1) Sci. Rep. 1-12 (2015). (Year: 2015).*
Amin et al., "Role of Single-Qubit Decoherence Time in Adiabatic Quantum Computation," in 80 Physical Rev. A 022303 (2009). (Year: 2009).*
E. Farhi et al., "A Quantum Adiabatic Evolution Algorithm Applied to Random Instances of an NP-Complete Problem," Science 292, 472 (2001).
A. P.—Ortiz, "Finding low-energy conformations of lattice protein models by quantum annealing," Scientific Reports 2, 571, pp. 1-7 (2012).
F. Barahona, "On the computational complexity of Ising spin glass models," J. Phys. A:Math. Gen. 15, pp. 3241-3253 (1982).
D. Miyashita et al., "An LDPC Decoder With Time-Domain Analog and Digital Mixed-Signal Processing," IEEE J. Solid-State Circuits, 49, No. 1, pp. 73-83 (2014).
International Search Report, dated Aug. 18, 2015, which issued during the prosecution of International Application No. PCT/JP2015/066324, which corresponds to the present application.

* cited by examiner

[Fig. 1]
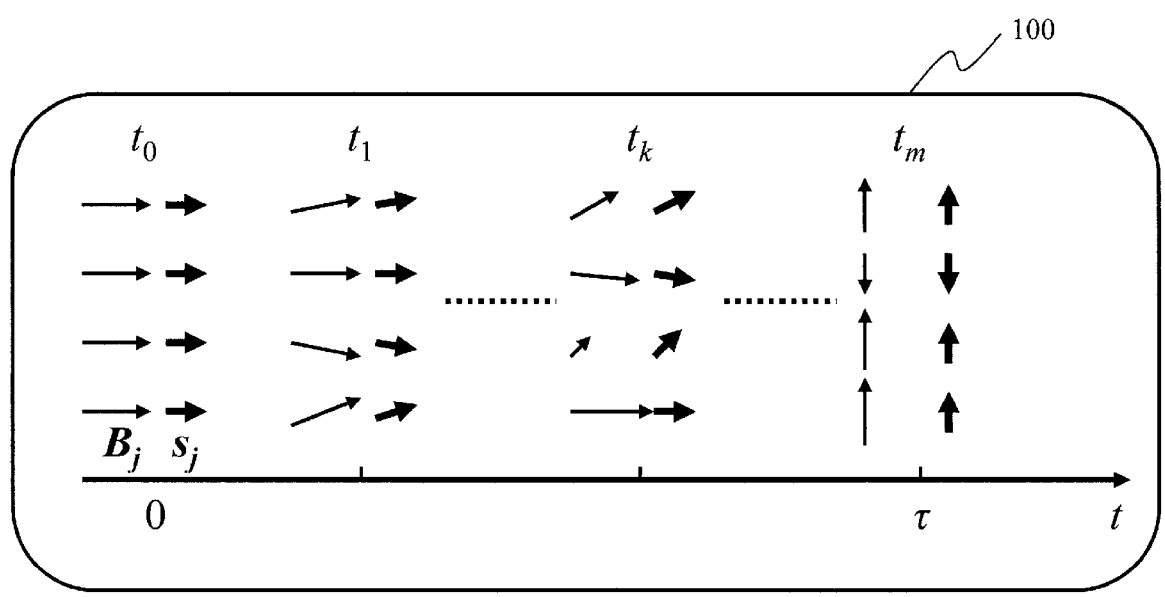

[Fig. 2]
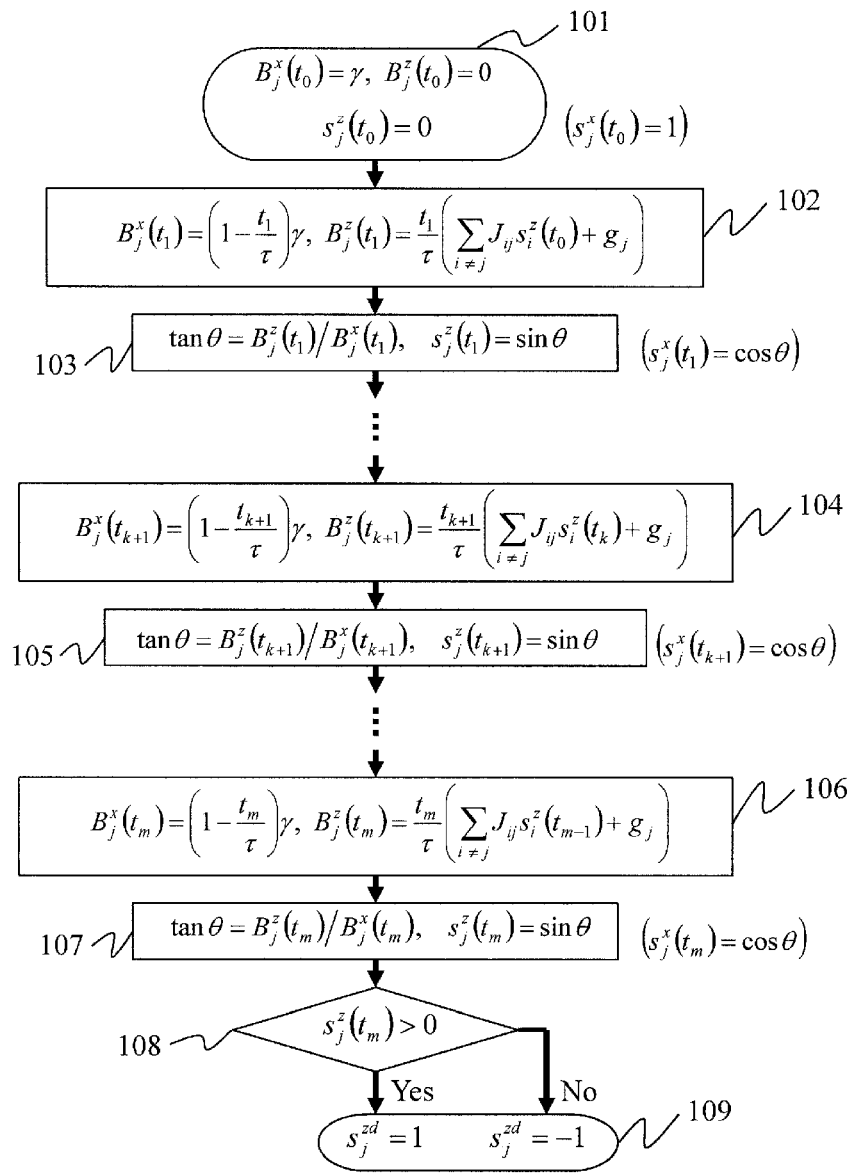

[Fig. 3]
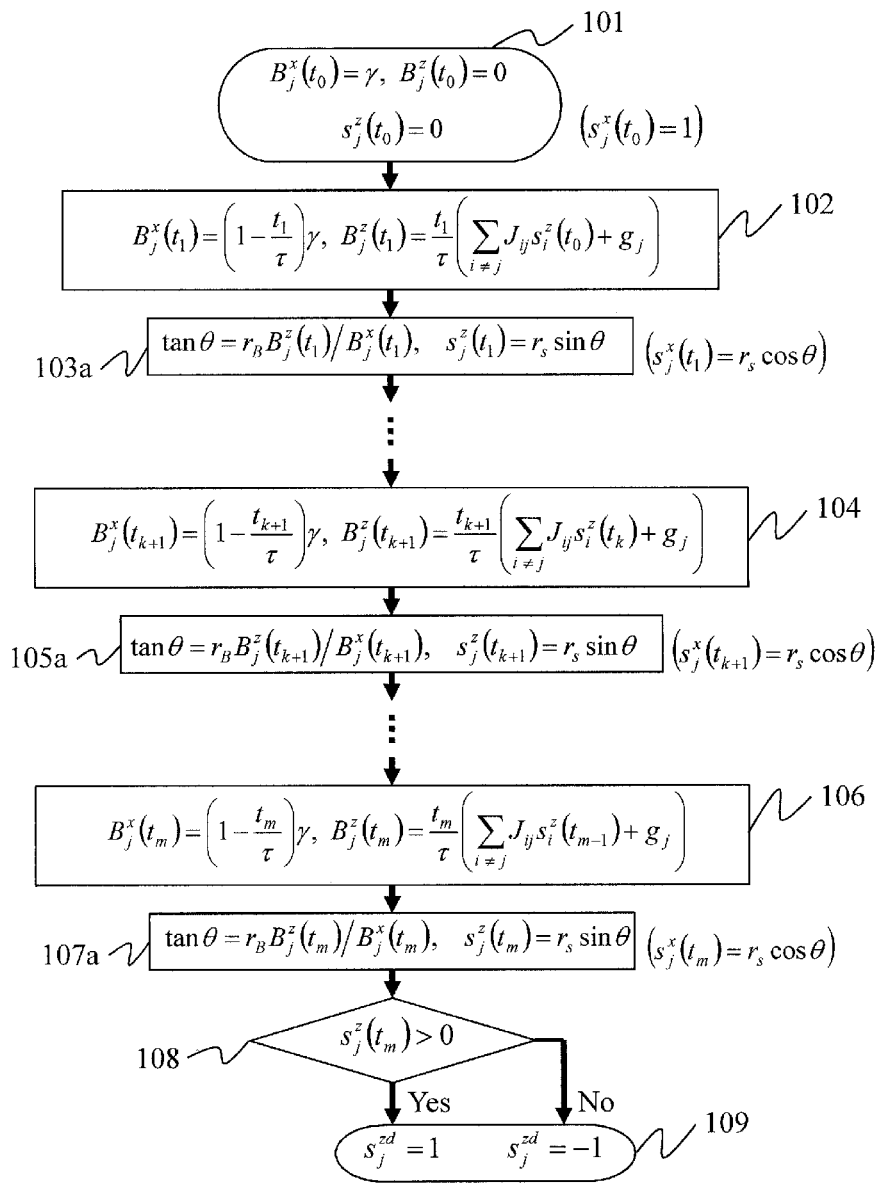

[Fig. 4]
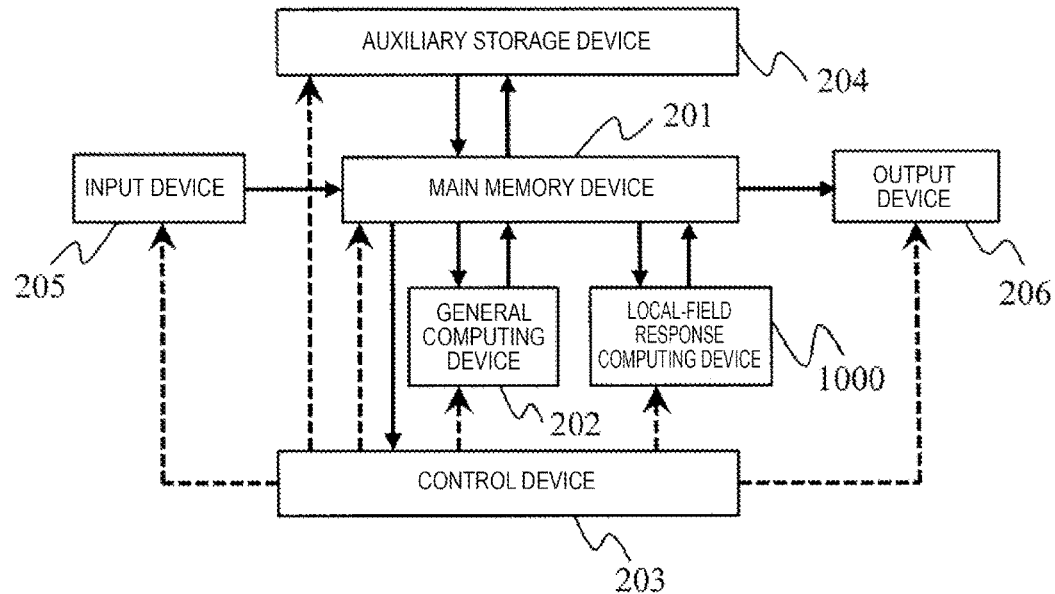
[Fig. 5]
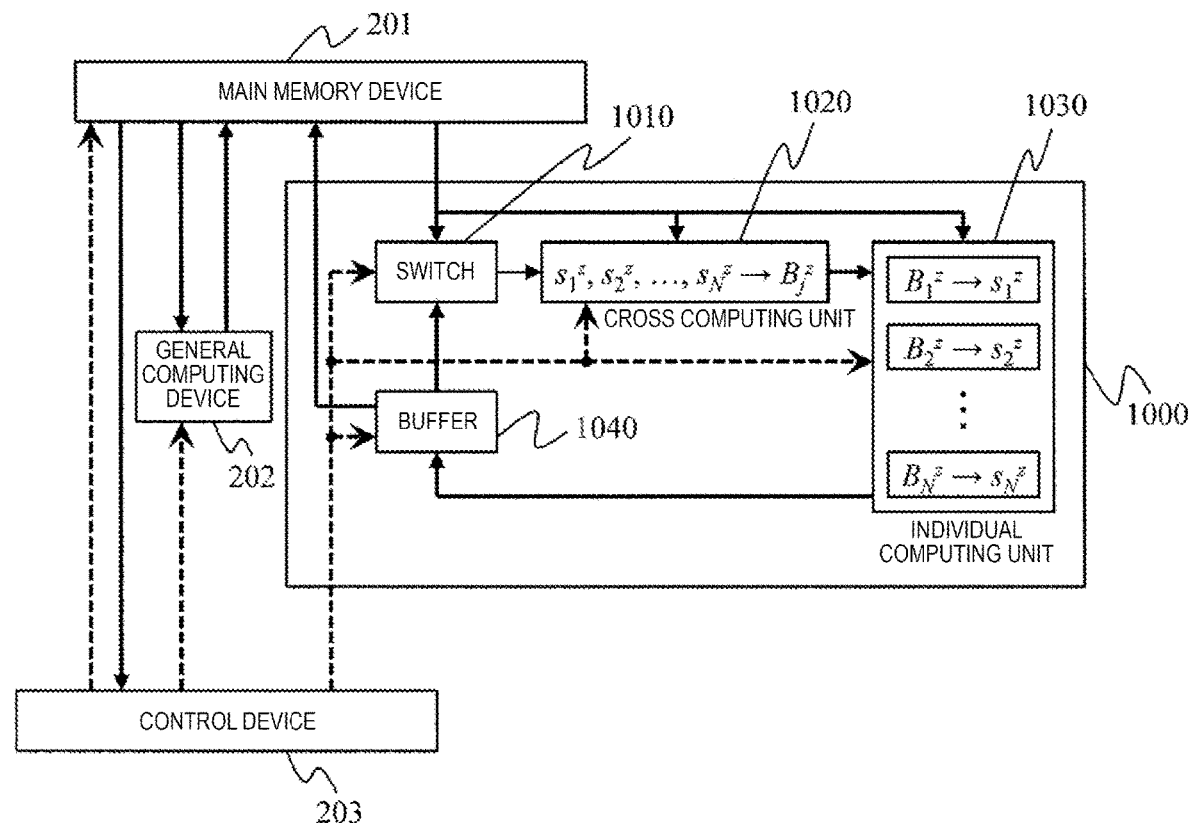

[Fig. 6]
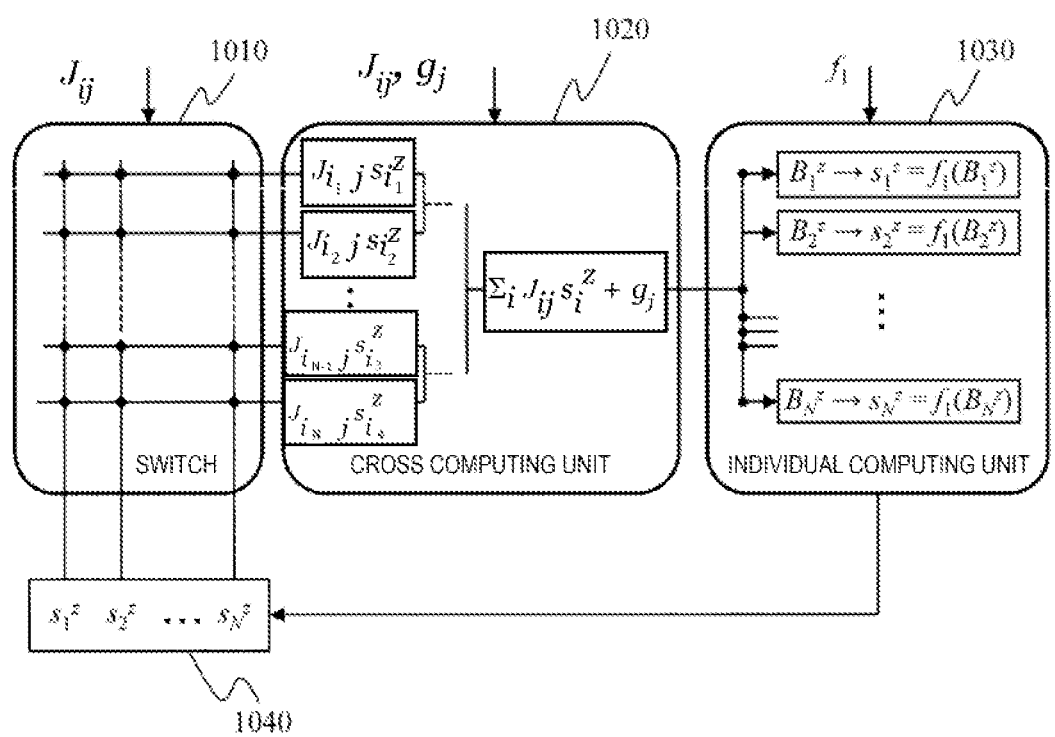

[Fig. 7]
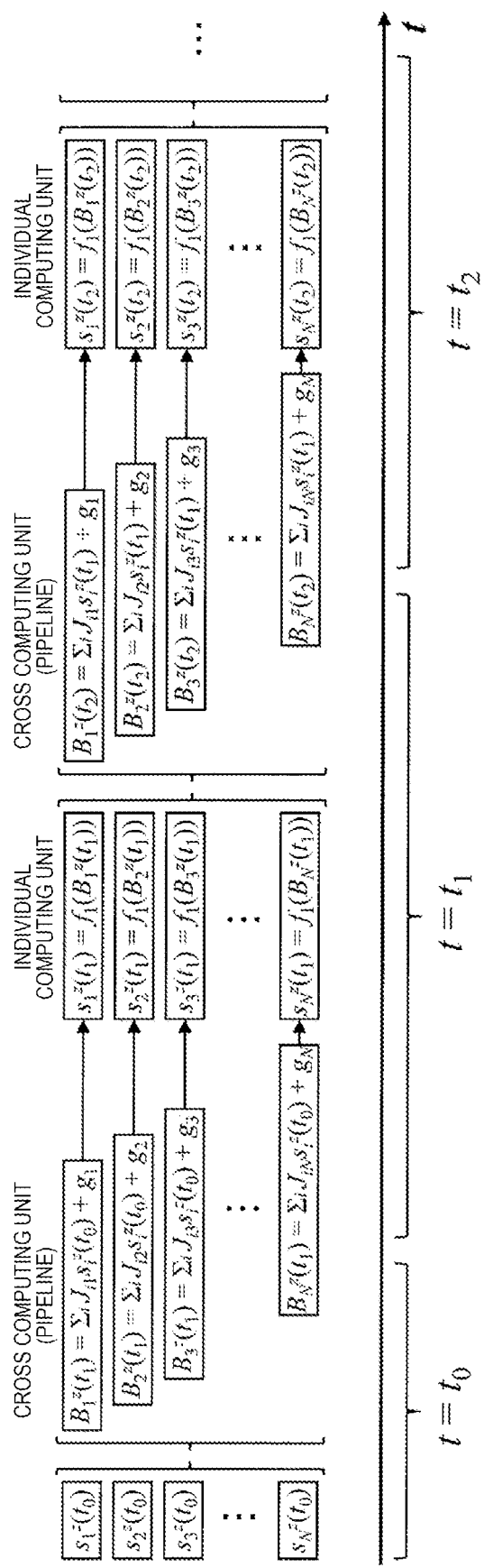

[Fig. 8]
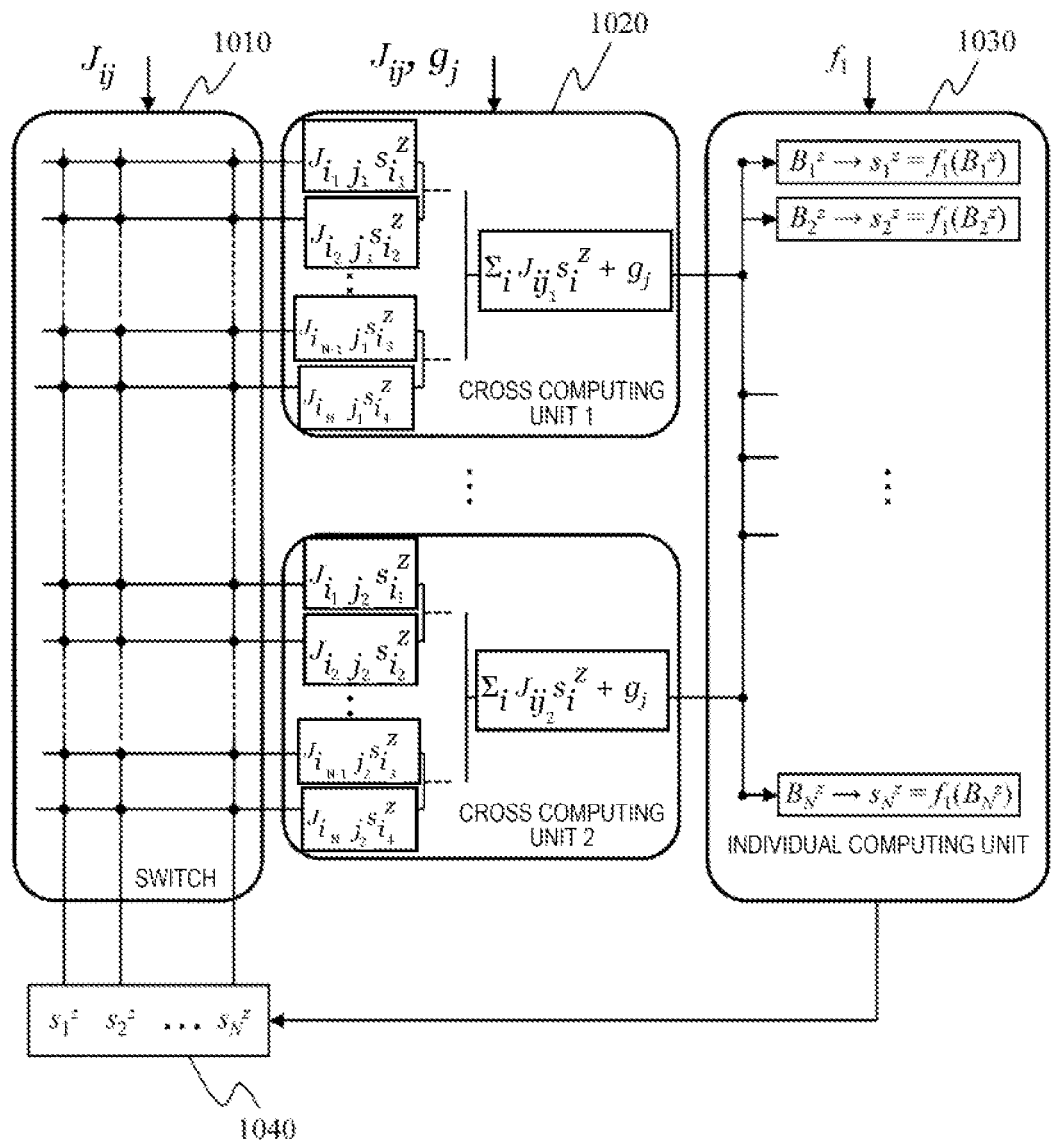

[Fig. 9]
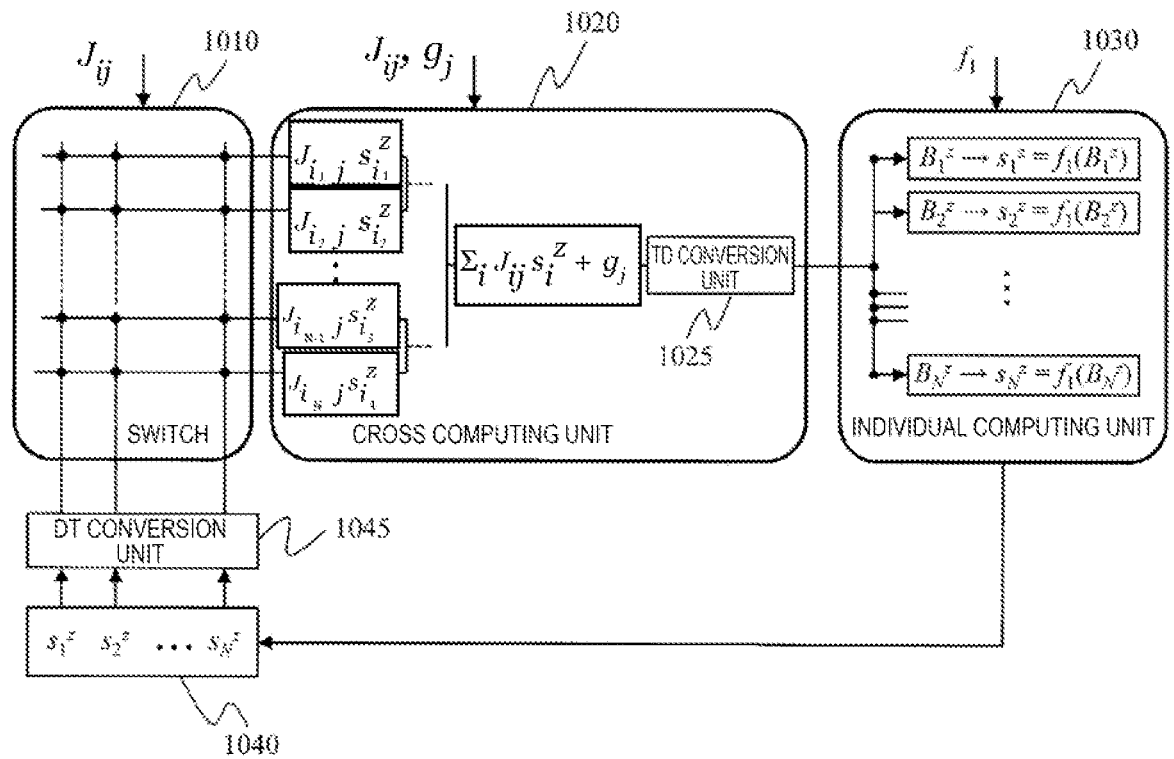
[Fig. 10]
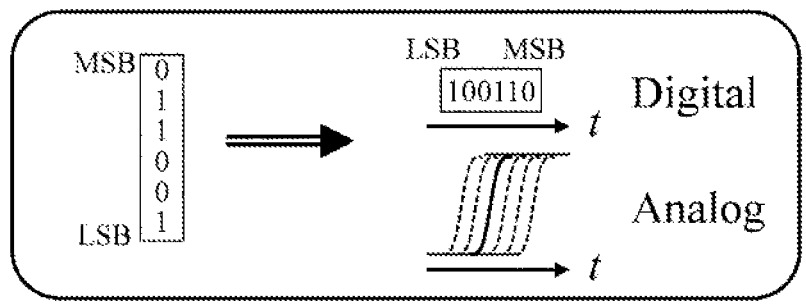

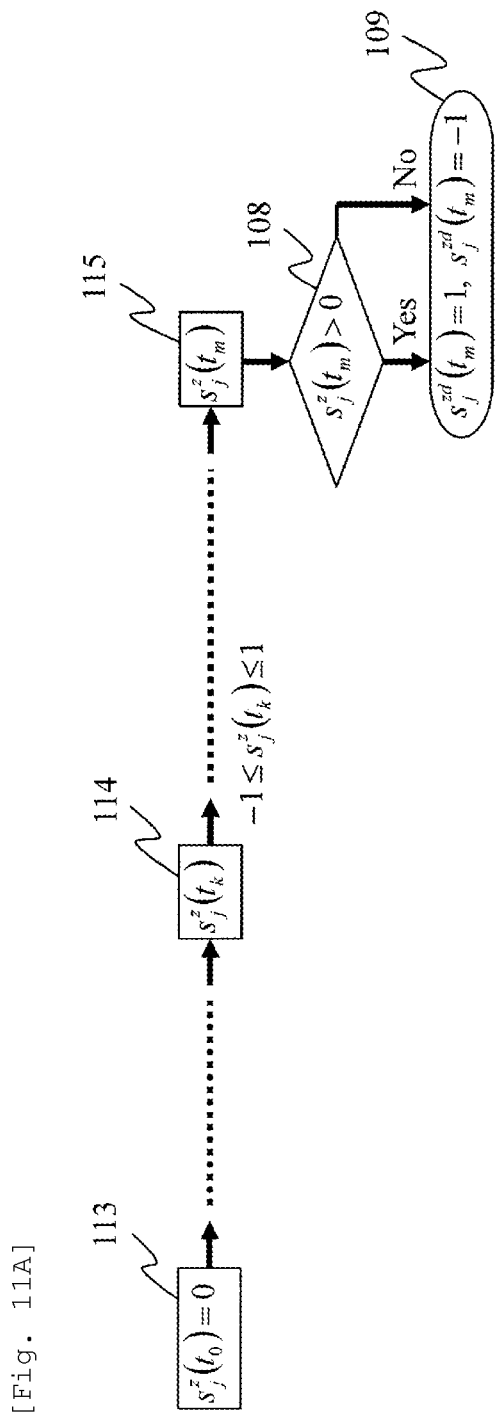
[Fig. 11A]

[Fig. 11B]
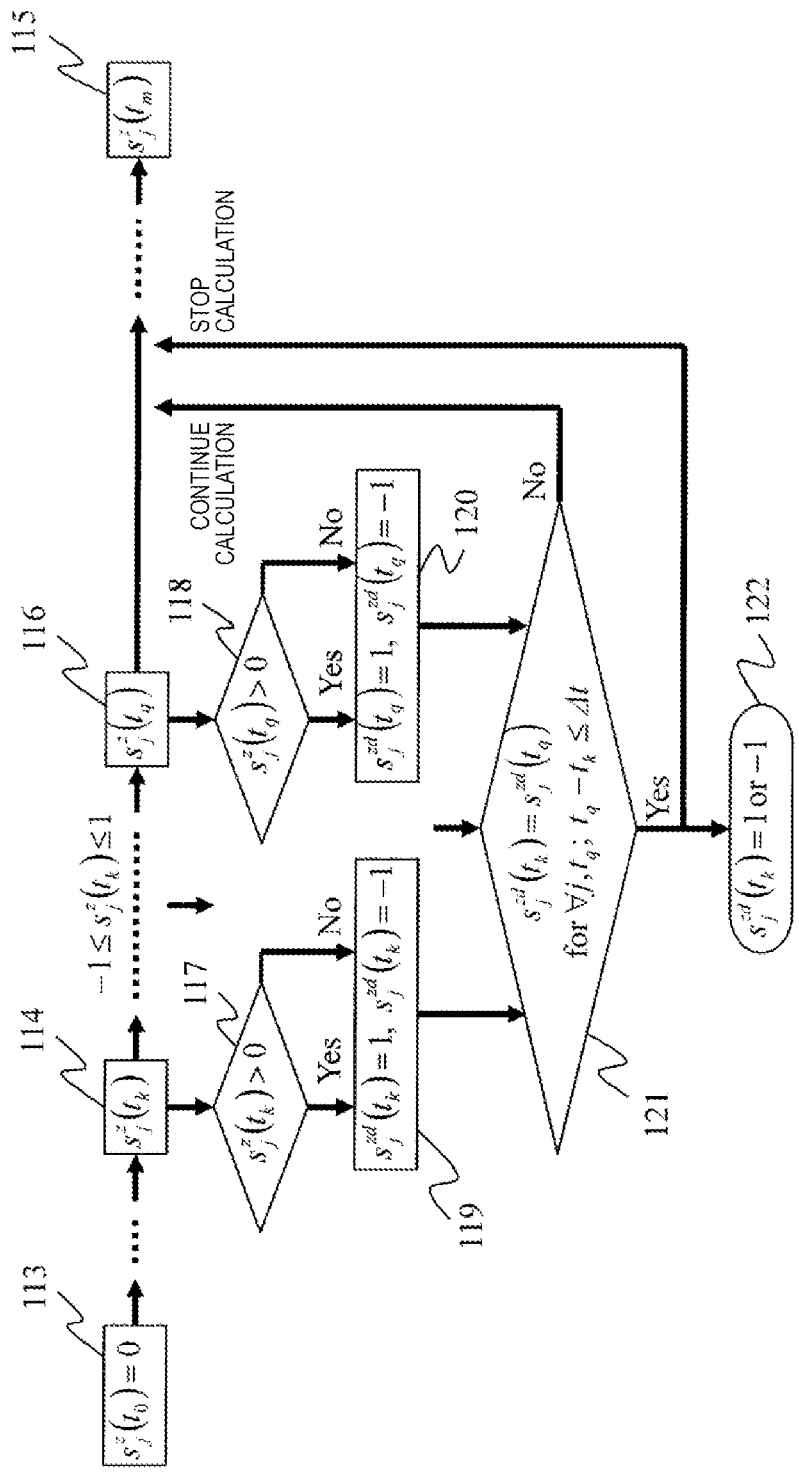

[Fig. 11C]
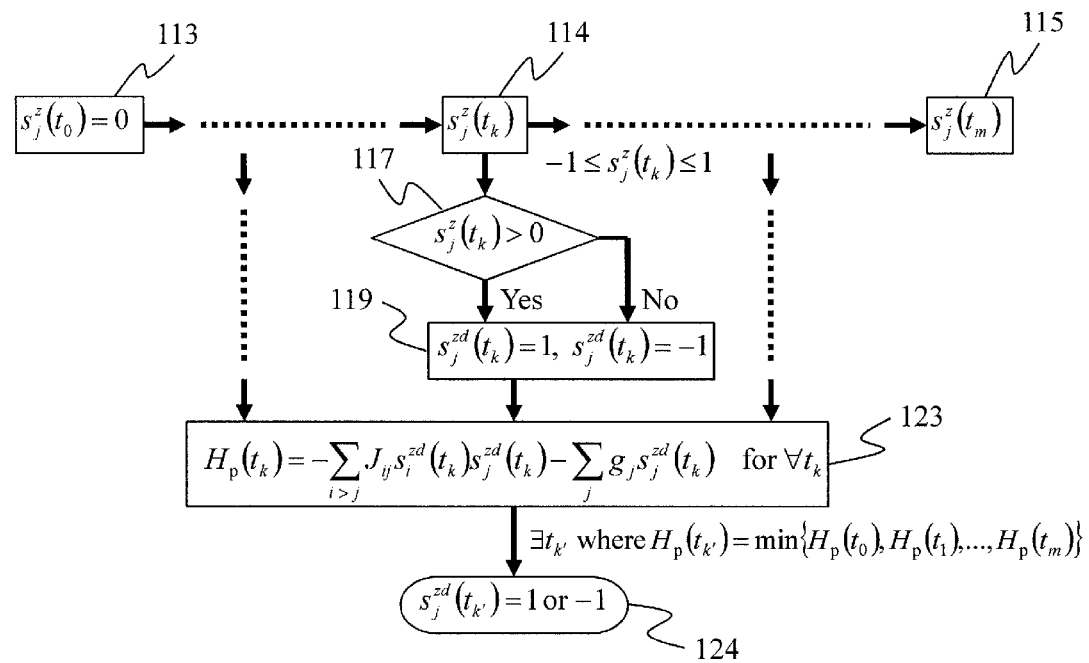

[Fig. 11D]
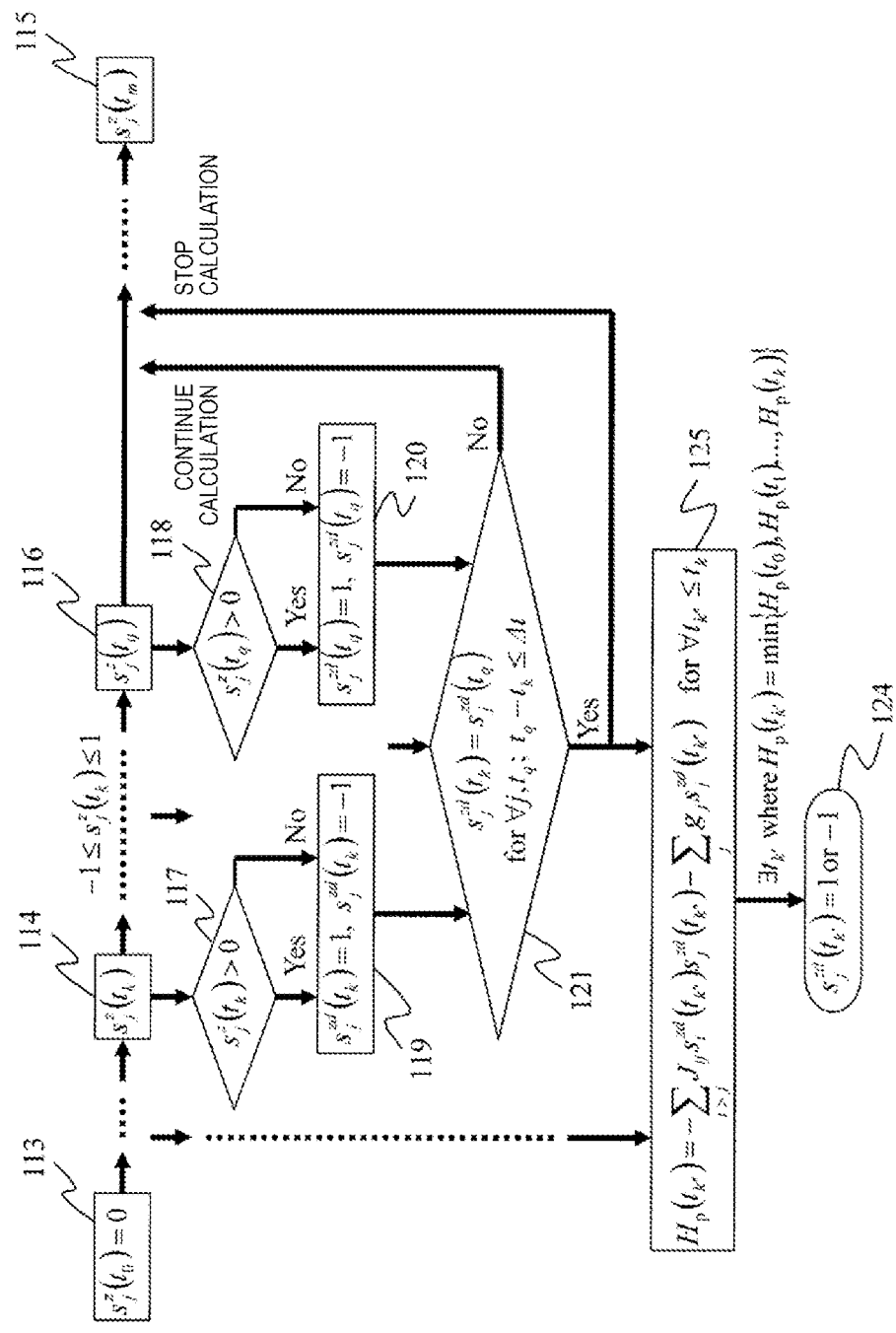

COMPUTING APPARATUS INCORPORATING QUANTUM EFFECTS THAT PERFORMS HIGH-SPEED COMPUTATION ON INVERSE PROBLEMS OR COMPUTATIONAL OPTIMIZATION PROBLEMS REQUIRING EXHAUSTIVE SEARCH

CROSS REFERENCE TO PRIOR APPLICATIONS

This application is a U.S. National Phase application under 35 U.S.C. § 371 of International Application No. PCT/JP2015/066324, filed on Jun. 5, 2015. The International Application was published in Japanese on Dec. 8, 2016 as WO 2016/194221 A1 under PCT Article 21(2). The contents of the above application are hereby incorporated by reference.

TECHNICAL FIELD

The present invention relates to a computing apparatus that is capable of performing high-speed computation on inverse problems or combinatorial optimization problems that need an exhaustive search.

BACKGROUND ART

The present age is overflowing with data, which is represented by the term "Big Data." In information science, one of the most important assignments is how this Big Data is interpreted and is handled. In Big Data, there are quite a lot of problems that need complicated interpretation. For example, when a certain result is obtained, there is a case where the cause thereof is desired. This is called an inverse problem. The more complicated a phenomenon is, the more difficult it is to make clear the cause thereof. Generally, there is no efficient algorithm that obtains the initial value from a result. In the worst case, an exhaustive search has to be made to obtain the initial value. This is one of the difficult problems in Big Data. Alternatively, there are also many problems requiring the determination of an optimal solution from many choices based on Big Data. In this case, an exhaustive search is needed in which all possibilities are taken into consideration. In the present invention, a computer that efficiently solves problems that need an exhaustive search is required.

Quantum computers are expected to solve exhaustive-search problems. Quantum computers consist of basic elements called qubits, which simultaneously represent the values of "0" and "1". For this reason, all candidates for the initial value can be simultaneously calculated, and there is a possibility that an exhaustive search may be completed. However, quantum computers need to maintain quantum coherence throughout calculation time, and thus far, this has not been achieved.

In this situation, a technique that is called adiabatic quantum computing is getting more attention (NPL 1). According to the adiabatic quantum computing technique, a problem is converted in such a manner that the ground state of a certain physical system is a solution, and the solution is obtained through the discovery of the ground state. Let $\hat{H}_p$ be a Hamiltonian of a physical system in which a problem is set. At the beginning of computation, however, the Hamiltonian is not $\hat{H}_p$ but a different Hamiltonian $\hat{H}_0$ for which the ground state is easily prepared. Next, the Hamiltonian is transformed from $\hat{H}_0$ to $\hat{H}_p$ with a sufficient period of time. When the transformation takes a sufficient period of time, the system continues to stay in the ground state, and the ground state for the Hamiltonian $\hat{H}_p$ is finally obtained. This is a principle of adiabatic quantum computing. Let the calculation time be $\tau$. A Hamiltonian is as expressed in Equation (1).

$$\hat{H}(t) = \left(1 - \frac{t}{\tau}\right)\hat{H}_0 + \frac{t}{\tau}\hat{H}_p \quad \text{[Equation 1]}$$

A solution is obtained by time-evolving the state with the Schroedinger's equation of Equation (2).

$$i\hbar\frac{\partial}{\partial t}|\psi(t)\rangle = \hat{H}(t)|\psi(t)\rangle \quad \text{[Equation 2]}$$

Adiabatic quantum computing is also applicable to a problem that needs an exhaustive search, and a solution is obtained in a one-way process. However, if the calculation process needs to be in accordance with the Schroedinger's equation of Equation (2), quantum coherence needs to be maintained as similar to that in the quantum computer. However, whereas quantum computing repeats gate operations on one qubit or between two qubits, adiabatic quantum computing makes the whole qubit system interact at the same time. There is a difference in the considered coherence between two methods. For example, let us consider a gate operation on a qubit. If there is an interaction between the qubit and a different qubit, the interaction causes decoherence. However, in adiabatic quantum computing, all qubits interact with each other at the same time, and therefore, there is no decoherence in that example. For this reason, adiabatic quantum computing is believed to be robust against decoherence compared with quantum computing.

However, there is a problem associated with adiabatic quantum computing as well. Even though adiabatic quantum computing is more robust than quantum computing with regards to decoherence, if a computation process is in accordance with the Schroedinger's equation of Equation (2), sufficient coherence is needed as well. Furthermore, to execute adiabatic quantum computing, a superconducting magnetic flux qubit system is required (PTL 1 and NPL 2). This raises a problem because when superconductivity is used, a cryogenic cooling apparatus is needed, and it is not practical to design computers capable of achieving extremely low temperatures, as required by a cryogenic cooling apparatus.

CITATION LIST

Patent Literature

JP-T-2009-524857

Non-Patent Literature

NPL 1: E. Farhi and et al., "A quantum adiabatic evolution algorithm applied to random instances of an NP-complete problem," Science 292 and 472 (2001).

NPL 2: A. P. —Ortiz, "Finding low-energy conformations of lattice protein models by quantum annealing,", Scientific Reports 2 and 571 (2012).

NPL 3: F. Barahona, "On the computational complexity of Ising spin glass models," J. Phys. A: Math. Gen. 15, and 3241 (1982).

NPL 4: D. Miyashita, R. Yamaki and K. Hashiyoshi, H. Kobayashi, S. Kousai, Y. Oowaki and Y. Unekawa, "An LDPC decoder with time-domain analog and digital mixed-signal processing," IEEE J. Solid-State Circuits, 49, No. 1, (2014).

SUMMARY OF INVENTION

Technical Problem

As described above, adiabatic quantum computing is effective against difficult problems that require exhaustive searches. However, adiabatic quantum computing still requires quantum coherence. Additionally, adiabatic quantum computing requires a cryogenic cooling apparatus when a superconductive magnetic flux qubit is used. The invention described herein removes the requirements for quantum coherence and a cryogenic cooling apparatus while performing quantum computing on a computing apparatus, and thus provides a more practical computing apparatus.

A target of the present invention is to provide a computing apparatus that solves the problems described above and which does not need quantum coherence and a cryogenic cooling apparatus.

Solution to Problem

Spins represent variables in computation, and here, a solution to compute a problem involves setting inter-spin interactions and applying local fields to each spin. An external magnetic field is gradually decreased in such a manner that all spins are directed uniformly along one direction at time t=0 by the external magnetic field, and that the external magnetic field is reduced to zero at time t=τ.

Each spin is time-evolved in such a manner that its orientation is determined in accordance with an effective magnetic field that consists of an external magnetic field and inter-spin interactions at each site at time t. Here, the spins are not completely directed along the effective magnetic field, and the orientation is quantum-mechanically corrected, and thus the system maintains the ground state almost accurately.

The spin described above is introduced as a model, and it does not need a real spin. A computing apparatus according to the present invention can be achieved using means such as an electric circuit. Here, an important point is that it is desirable that all interactions in the N-spin system can be set arbitrarily.

In a specific example according to the present invention, a computing unit is separated into a cross computing unit and an individual-computing unit, and the cross computing unit performs pipeline processing. That enables us to arbitrarily set the interactions with a relatively small number of switches without decreasing computation speed.

According to another aspect of the present invention, a computing apparatus is provided with a general computing unit, a local-field response computing unit, a storage unit, and a control unit, in which under the control of the control unit, data are transmitted and received between the storage unit and the general computing unit or between the storage unit and the local-field response computing unit. Here, the local-field response computing unit includes a cross computing unit, an individual-computing unit, a buffer, and a switch unit. The cross computing unit determines N variables $B_j^z = B_j^z(s_1^z, s_2^z, \ldots, s_N^z)$ from N variables $s_j^z$ (j=1, 2, ..., N). The individual-computing unit determines $s_j^z = s_j^z(B_j^z)$ from each of the N variables $B_j^z$. Computations are repeatedly performed using the components described above and in the following order: the individual-computing unit, the buffer, the switch, the cross computing unit, and the individual-computing unit. Furthermore, information that is necessary in the switch, the cross computing unit, and the individual-computing unit is stored in the storage unit, and computation is performed under the control of the control unit.

The local-field response computing unit can be configured with a piece of dedicated or general-purpose hardware.

According to a preferable aspect of the present invention, N variables $B_1^z, B_2^z \ldots, B_N^z$ are determined in this order through performing pipeline processing in the cross computing unit, using the N $s_j^z$ that are stored in the buffer.

According to another preferable aspect of the present invention, the variables $s_j^z$ and $B_j^z$ are configured with multi-bits.

According to another preferable aspect of the present invention, the variables s z are configured with multi-bits; the N $s_j^z$'s that are stored in the buffer are transferred beginning at the least significant bit (LSB); and the processing of $s_j^z$ in the cross computing unit is performed beginning at the LSB.

According to another preferable aspect of the present invention, when the N $s_j^z$'s that are stored in the buffer are transferred to the switch unit, $s_j^z$ is set to be a time-direction analog value and is processed with an analog format in the processor in the cross computing unit.

A more specific example of a processing sequence according to the present invention is described as follows. The N variables $s_j^z$ (j=1, 2, ..., N) take the range of $-1 \le s_j^z(t_k) \le 1$, and an assignment is set using local fields $g_j$ and inter-variable interactions $J_{ij}$ (i, j=1, 2, ..., N). In the local-field response computing unit, time is divided into m intervals and computing is performed discretely from $t=t_0$ ($t_0=0$) to $t_m$ ($t_m=\tau$). In the computation, in obtaining a variable $s_j^z(t_k)$ at each time $t_k$, $B_j^z(t_k) = \{\Sigma_i J_{ij} s_i^z(t_{k-1}) + g_j\} \cdot t_k/\tau$ is calculated using values of variables $s_i^z(t_{k-1})$ (i=1, 2, ..., N) at time $t_{k-1}$ that is earlier than time $t_k$. Then, $s_j^z(t_k)$ is determined as $s_j^z(t_k) = f(B_j^z(t_k), t_k)$, where the function f is defined in such a manner that the range of $s_j^z(t_k)$ is $-1 \le s_j^z(t_k) \le 1$. As time proceeds from $t=t_0$ to $t=t_m$, $s_j^z$ approaches $-1$ or $1$, and a solution is determined as $s_j^{zd}=-1$ if finally $s_j^z<0$ and $s_j^{zd}=1$ if $s_j^z>0$.

For example, at each time $t_k$, if $s_j^z(t_k)<0$, $s_j^{zd}(t_k)=-1$ is set, and if $s_j^z(t_k)>0$, $s_j^{zd}(t_k)=1$ is set, and $H_p(t_k)=-\Sigma_{i>j} J_{ij} s_i^{zd}(t_k) s_j^{zd}(t_k) - \Sigma_j g_j s_j^{zd}(t_k)$ is calculated. The final solution is $s_j^{zd}(t_{k'})$ at time $t_{k'}$ at which $H_p(t_k)$ took the minimum value.

These processing sequences may be achieved with software-based information processing, but are typically achieved using an ordinary computer and a hardware resource that includes a local-field response computing unit. Alternatively, all processing sequences may be achieved with dedicated hardware.

According to another aspect of the present invention, a computing apparatus is provided with a general computing unit, a local-field response computing unit, a storage unit, and a control unit, in which under the control of the control unit, data are transmitted and received between the storage unit and the general computing unit or between the storage unit and the local-field response computing unit. In the computing apparatus, N variables $s_j^z$ (j=1, 2, ..., N) take multi-bit values that are set in the range of $-1 \le s_j^z \le 1$.

An assignment is set by local fields $g_j$ and inter-variable interactions $J_{ij}$ (i, j=1, 2, . . . , N). In the local-field response computing unit, time is divided into m intervals and computing is performed discretely from $t=t_0$ ($t_0=0$) to $t_m$ ($t_m=\tau$). In the computation in obtaining a variable $s_j^z(t_k)$ at each time $t_k$, $B_j^z(t_k)=\{\Sigma_i J_{ij} s_i^z(t_{k-1})+g_i\} \cdot t_k/\tau$ is calculated with values of variables $s_i^z(t_{k-1})$ (i=1, 2, . . . , N) at time $t_{k-1}$ that is earlier than time $t_k$, $s_j^z(t_k)$ is determined as $s_j^z(t_k)=f(B_j^z(t_k), t_k)$, where the function f is defined in such a manner that the range of $s_j^z(t_k)$ is $-1 \leq s_j^z(t_k) \leq 1$. As time proceeds from $t=t_0$ to $t=t_m$, $s_j^z$ approaches $-1$ or $1$. Calculation of $B_j^z(t_k)=\{\Sigma_i J_{ij} s_i^z(t_{k-1})+g_j\} \cdot t_k/\tau$ is performed using a multiplexed transmission path, and after the calculation, the transmission path is demultiplexed to separate every $B_j^z(t_k)$. In a more specific example according to the present invention, the multiplexing is configured as time division multiplexing.

Advantageous Effects of Invention

The present invention is a quantum computing apparatus which is operational in a classical system, although quantum-mechanical corrections are added. For this reason, we do not need to take quantum coherence into consideration, which increases the amount of resources which may be used to design and manufacture such a quantum computing apparatus. For example, an electric circuit can be used. If an energy scale related to a bit is set to be sufficiently larger than an energy scale of temperature, temperature fluctuations can be ignored and a special apparatus, such as a cryogenic apparatus or a special environment, is also unnecessary.

BRIEF DESCRIPTION OF DRAWINGS

FIG. 1 is a schematic diagram describing an algorithm used in embodiments of the present invention in principle.

FIG. 2 is a flow diagram in the form of a flowchart, which illustrates an example of an algorithm according to Embodiment 1.

FIG. 3 is a flow diagram in the form of a flowchart, which illustrates an example of an algorithm according to Embodiment 2.

FIG. 4 is a block diagram illustrating a configuration example of a computing apparatus according to Embodiment 3.

FIG. 5 is a block diagram mainly illustrating the internal structure of the local-field response computing device according to Embodiment 3.

FIG. 6 is a block diagram illustrating the internal structure of the local-field response computing device in detail according to Embodiment 3.

FIG. 7 is a timing diagram illustrating a flow along the time-axis in local-field response computation according to Embodiment 3.

FIG. 8 is a block diagram illustrating an internal structure in another form of the local-field response computing device according to Embodiment 3.

FIG. 9 is a block diagram of an internal structure of a local-field response computing device in detail in a case where the local-field response computation is partly performed with analog processing on the time-axis according to Embodiment 4.

FIG. 10 is an image diagram in a case where a multi-bit digital value is converted into an analog value along the time-axis direction according to Embodiment 4.

FIG. 11A is a flow diagram in the form of a flowchart, which illustrates an example of an algorithm related to a final-solution-determining method according to Embodiment 5.

FIG. 11B is a flow diagram in the form of a flowchart, which illustrates another example of an algorithm related to a final-solution-determining method according to Embodiment 5.

FIG. 11C is a flow diagram in the form of a flowchart, which illustrates another example of an algorithm related to a final-solution-determining method according to Embodiment 5.

FIG. 11D is a flow diagram in the form of a flowchart, which illustrates another example of an algorithm related to a final-solution-determining method according to Embodiment 5.

DESCRIPTION OF EMBODIMENTS

Various embodiments of the present invention will be described below together with the principle of computation with reference to the accompanying drawings. However, the present invention is not limited to descriptions in embodiments that will be described below. It is apparent that a person with the same expertise can modify a specific configuration of the present invention within a range that does not depart from the nature and gist of the present invention.

For the configuration of the invention that will be described below, the same portion or portions that have similar functions are given the same reference numerals in different drawings, and the same descriptions are frequently omitted.

The terms "first", "second", "third", and so forth in the present specification are used for distinguishing constituents, and the terms do not necessarily restrict the number itself or the order itself. Furthermore, the number for distinguishing the constituents is used context-by-context, and the number that is used in one context does not necessarily refer to the same constituent in other contexts. Furthermore, a constituent that is identified by a certain number is not prevented from being part of a constituent that is identified by a different number.

In some cases, the drawings are primarily used to provide a simple understanding of the invention, and characteristics of constituents of the invention illustrated in the drawings, such as the constituents' respective positions, sizes, shapes, ranges, etc., do not show their actual respective positions, sizes, shapes, ranges, etc. For this reason, the present invention does not necessarily impose any limitation on the positions, sizes, shapes, ranges, etc. based on how they are illustrated in the drawings.

Adiabatic quantum computing is also called quantum annealing, and it is a method where the concept of classical annealing has been quantum-mechanically expanded. That is, adiabatic quantum computing is interpreted as a computing method that can classically operate in nature, and to which quantum-mechanical effects are added in order to improve computing performance in terms of speed and the probability of successful solutions. Hence, in the present embodiment, the computing apparatus itself is produced classically, but a computing method or the apparatus is intended to include quantum-mechanical effects in the computation process through introducing parameters that are quantum-mechanically determined.

Based on the concept described above, the following embodiments describe a classical methodology (algorithm) for obtaining the ground state as the solution and configuring an apparatus for achieving this ground state solution, wherein adiabatic quantum computing is referred to for helping understanding.

Embodiment 1

Embodiment 1 describes the principle of the present embodiment, starting to describe it quantum-mechanically and transforming it to a classical form.

A problem for searching for the ground state of an Ising spin Hamiltonian given by Equation (3) includes problems classified as so-called NP-hard problems, which are known to be useful problems (NPL 3).

$$\hat{H}_P = -\sum_{i>j} J_{ij}\hat{\sigma}_i^z\hat{\sigma}_j^z - \sum_j g_j\hat{\sigma}_j^z \qquad [\text{Equation 3}]$$

$J_{ij}$ and $g_j$ are parameters for setting the problem, and $\hat{\sigma}_j^z$ is the z component of the Pauli spin matrix and takes the eigenvalue of ±1. i and j represent spin sites. The Ising spin is a variable that takes only ±1 as a value, and Equation (3) expresses an Ising spin system because the eigenvalue of $\hat{\sigma}_j^z$ is ±1. The Ising spin in Equation (3) does not need to be a spin as the name implies, and it may be anything physical as long as the Hamiltonian is described by Equation (3). For example, high and low states of a logic circuit can be associated with +1 and −1; vertical and horizontal polarizations of light can be associated with +1 and −1; or 0 and π phases are associated with +1 and −1. In the method in the present embodiment, the computing system is prepared in the ground state for the Hamiltonian of Equation (4) at time t=0 as similar to that in adiabatic quantum computing.

$$\hat{H}_0 = -\gamma \sum_j \hat{\sigma}_j^x \qquad [\text{Equation 4}]$$

γ is a proportional constant that is determined in accordance with the magnitude of an external field that is uniformly applied to all sites j, and $\hat{\sigma}_j^x$ is the x component of the Pauli spin matrix. When the computing system consists of spins themselves, the external field means a magnetic field. Equation (4) corresponds to applying a transverse field, and the ground state is the case where all spins are directed to the x-direction (γ>0). The Hamiltonian for setting a problem is defined using an Ising spin system that has only the z components, but the x component of the spins appears in Equation (4). Therefore, the spins in the computation process are not characterized as Ising spins but are instead assumed to be vectors (Bloch vectors). The computation starts with the Hamiltonian of Equation (4) at t=0. The Hamiltonian gradually changes with the passage of time t; it is finally transformed to the Hamiltonian described in Equation (3); and the ground state for the Hamiltonian is the solution.

Let us consider how the spin responds to the external field in the case of a one-spin system first. The Hamiltonian of the one-spin system is given by Equation (5).

$$\hat{H} = -B \cdot \hat{\sigma} \qquad [\text{Equation 5}]$$

Here, $\hat{\sigma}$ represents the three components of the Pauli spin matrices as a vector. The ground state is the case where the spin is directed to the magnetic field direction. Let <•> be a quantum-mechanical expectation value. The ground state is written as $\langle\hat{\sigma}\rangle = B/|B|$. Because an adiabatic process continues to maintain the ground state, the direction of the spin always follows that of the magnetic field.

The description so far can be expanded to a multi-spin system. The Hamiltonian is given by Equation (4) at t=0. This equation means that a magnetic field $B_j^x = \gamma$ is applied to all spins. The x component of the magnetic field is gradually weakened in accordance with $B_j^x = \gamma(1-t/\tau)$ at t>0. The z component of the effective magnetic field which is comprised of inter-spin interactions is given by Equation (6).

$$\hat{B}_j^z(t) = \frac{t}{\tau}\Big(\sum_{i \neq j} J_{ij}\hat{\sigma}_i^z + g_j\Big) \qquad [\text{Equation 6}]$$

Because the spin direction can be prescribed with $\langle\hat{\sigma}_j^z\rangle / \langle\hat{\sigma}_j^x\rangle$, if the direction of the spin follows that of the effective magnetic field, the spin direction is determined by Equation (7).

$$\frac{\langle\hat{\sigma}_j^z\rangle}{\langle\hat{\sigma}_j^x\rangle} = \frac{\langle\hat{B}_j^z(t)\rangle}{\langle\hat{B}_j^x(t)\rangle} \qquad [\text{Equation 7}]$$

Although Equation (7) is based on a quantum-mechanical description, it is an equation related to classical quantities because expectation values are taken, unlike Equations (1) through (6). Because there is no non-local correlation (quantum entanglement) of quantum mechanics in classical systems, the orientation of the spin should be completely determined by the local field in each site, and Equation (7) determines the behavior of classical spin systems. Because there is non-local correlation in quantum systems, Equation (7) will be modified. However, the modification will be described in Embodiment 2 and subsequent embodiments. The present embodiment describes the classical system prescribed with Equation (7) in order to describe a basic form.

FIG. 1 illustrates a timing chart (procedure 100) for obtaining the ground state of a spin system. Because the illustration in FIG. 1 relates to classical quantities, the spin of site j is represented by $s_j$, not by $\hat{\sigma}_j$. Accordingly, the effective magnetic field $B_j$ in FIG. 1 is a classical quantity. An effective magnetic field $B_j$ oriented to the right direction is applied to all sites at t=0, and $s_j$ of all sites is initialized to the right direction. With the passage of time t, the magnetic field in the z-axis direction and the inter-spin interactions are gradually added, and finally the spin is +z-directed or −z-directed; the z component of the spin $s_j$ is obtained as $s_j^z = +1$ or −1. Time t should be continuous if ideally treated, but it can be discrete to improve convenience. The following descriptions are discrete cases.

The spins in the present embodiment are vectorial because the x component is added in addition to the z component. A vectorial behavior can be also understood from FIG. 1. The y component has not appeared so far. This is because the external field is applied in the xz plane; there is no y component of the external field; and thus $\langle\hat{\sigma}^y\rangle = 0$. The spin in the computing system is assumed to be a three-dimensional vector with a magnitude of 1 (which is called a Bloch vector and a state can be expressed as a point on a sphere).

However, the vector can be described with only two dimensions in the axes according to the present embodiment (a state can be expressed with a point on a circle). Furthermore, because γ is constant, $B_j^x(t)>0$ (γ>0) or $B_j^x(t)<0$ (γ<0); the two-dimensional spin vector can be described only with a semi-circle. Thus, if $s_j^z$ represents a range [−1,1], the two-dimensional spin vector is determined with only one variable of $s_j^z$. Therefore, the spin in the present embodiment can be denoted as a one-dimensional continuous variable, the range of which is [−1,1], although it is a two-dimensional vector.

In the procedure 100 in FIG. 1, an effective magnetic field is calculated site-by-site at time $t=t_k$, and the orientation of the spin at $t=t_k$ is determined with Equation (8) using the value of the effective magnetic field.

$$s_j^z(t_k)/s_j^x(t_k)=B_j^z(t_k)/B_j^x(t_k) \quad \text{[Equation 8]}$$

Because Equation (8) is rewritten from Equation (7) to express a relation between the classical quantities, the symbol <•> is not used.

Next, the effective magnetic field at $t=t_{k+1}$ is calculated using values of the spins at $t=t_k$. The effective magnetic field at each time is specifically written by Equations (9) and (10).

$$B_j^x(t_{k+1}) = \left(1 - \frac{t_{k+1}}{\tau}\right)\gamma \quad \text{[Equation 9]}$$

$$B_j^z(t_{k+1}) = \frac{t_{k+1}}{\tau}\left(\sum_{i \neq j} J_{ij}s_i^z(t_k) + g_j\right) \quad \text{[Equation 10]}$$

In the following, the spin and the effective magnetic field will be alternately determined in accordance with a procedure 100 schematically illustrated in FIG. 1.

The magnitude of a spin vector is 1 in the classical system. Each component of the spin vector in this case is described as $s_j^z(t_k)=\sin\theta$, $s_j^x(t_k)=\cos\theta$ using the parameter θ that is defined with $\tan\theta=B_j^z(t_k)/B_j^x(t_k)$. These are rewritten to $s_j^z(t_k)=\sin(\arctan(B_j^z(t_k)/B_j^x(t_k)))$ and $s_i^x(t_k)=\cos(\arctan(B_j^z(t_k)/B_j^x(t_k)))$.

As apparent from Equation (9), the variable in $B_j^x(t_k)$ is only $t_k$, and τ and γ are constants. Therefore, $s_j^z(t_k)=\sin(\arctan(B_j^z(t_k)/B_j^x(t_k)))$ and $s_j^x(t_k)=\cos(\arctan(B_j^z(t_k)/B_j^x(t_k)))$ can also be generally expressed as functions like $s_j^z(t_k)=f_1(B_j^z(t_k), t_k)$ and $s_i^x(t_k)=f_2(B_j^z(t_k), t_k)$ arguments of which are $B_j^x(t_k)$ and $t_k$.

Because the spin is described as a two-dimensional vector, two components of $s_j^z(t_k)$ and $s_j^x(t_k)$ appear, but if $B_j^z(t_k)$ is determined based on Equation (10), $s_j^x(t_k)$ is not necessary. This corresponds to the fact that a spin state can be described only with $s_j^z(t_k)$, the range of which is [−1,1]. Because the final solution $s_j^{zd}$ needs to be $s_j^{zd}=-1$ or 1, if $s_j^z(\tau)>0$, $s_j^{zd}=1$, and if $s_j^z(\tau)<0$, $s_j^{zd}=-1$.

FIG. 2 illustrates a flowchart in which the algorithm described above is summarized, where $t_m=\tau$. Each of steps 101 to 109 in the flowchart in FIG. 2 corresponds to the processing at a time in the procedure 100 in FIG. 1, performed from time t=0 to t=τ. That is, each of steps 102, 104, and 106 in the flowchart corresponds to Equations (9) and (10) at $t=t_1$, $t_{k+1}$, and $t_m$, respectively. The final solution is determined in step 108, where $s_j^{zd}=-1$ for $s_j^z<0$ and $s_j^{zd}=1$ for $s_j^z>0$ (109).

So far, what has been described is the method for determining a solution when a problem is expressed with Equation (3). Next, let us describe how a specific problem is expressed with Equation (3), which includes local fields $g_j$ and inter-variable interactions $J_{ij}$ (i, j=1, 2, ..., N), by describing a specific example. As an example, let us consider a problem of an electric power supply management. In this case, the local field is assigned to be a quantity of natural phenomenon, such as temperature, or electric power consumption. That is, let local field $g_j$ (j=1 to 10) be the temperature at each district; let local field $g_j$ (j=11 to 20) be electric power consumption at public facilities (e.g., a library, a theater, a supermarket, etc.) in each district; and let local field $g_j$ (j=21 to 100) be the electric power consumption at each household.

Let $\hat{\sigma}_j^z$ (j=11 to 100) be a variable representing where electric power is distributed. Here, because j=1 to 10 is a subscript representing a temperature, $\hat{\sigma}_j^z$ (j=1 to 10) does not represent an electric power distribution, and it is considered as a variable for expressing how temperature influences activities at the public facilities and households. Because the temperature is determined with natural phenomena and thus is hardly influenced by artificial factors, the local field $g_j$ (j=1 to 10) is set to such a high value that it results in $\hat{\sigma}_j^z$ (j=1 to 10) not being influenced by other variables.

The degree of correlation between the temperature and each of the public facilities and households is expressed through inter-variable interaction $J_{ij}$. The correlation between the temperature and the electric power consumption is also influenced by the concept of electric power sharing that has been proposed in recent years. The following is an example of electric power sharing: to reduce electric power consumption during a span of time when air conditioning is necessary, a household member moves from his or her household to a public facility so that the household member does not use an air conditioner at his or her household during the time span at which air conditioning is necessary. The movement of the household member from his or her household to a public facility is expressed through inter-variable interaction $J_{ij}$, the value of which is not zero for subscript i=11 to 20 representing public facilities and for subscript j=21 to 100 representing households. However, because the interaction based on this concept is smaller than direct correlations between the temperature and the activities in the households, the value of the inter-variable interaction $J_{ij}$ is relatively small. Furthermore, because households are not managed independently and exert influences on each other, the inter-variable interactions $J_{ij}$ (i, j=21 to 100) are finite as well. In accordance with the considerations described above, the inter-variable interactions $J_{ij}$ are specifically set, and an optimal electric power supply distribution (eigenvalue of $\hat{\sigma}_j^z=+1$ or −1) is obtained through searching for the ground state of Equation (3).

When each item cannot be expressed with one variable of $\hat{\sigma}_j^z$, plural $\hat{\sigma}_j^z$'s may be used, and according to this, plural local fields $g_j$ and plural inter-variable interactions $J_{ij}$ are used for each item. Although $\hat{\sigma}_j^z$ is a variable representing an electric power distribution, it correlates with movements of human being's (e.g. the movement of a household member from his or her household to a public utility) and whether public utilities are open or closed. For this reason, the obtained solution may be interpreted as "A certain public utility should be closed."

Application of Equation (3) described in this embodiment is not limited to the problem of electric power supply management. The method in this embodiment is applicable to many problems, such as tour course optimization, vehicle guidance for avoiding traffic congestion, circuit design, product supply management, scheduling, and financial asset selection.

Embodiment 2

In Embodiment 1, we have transferred quantum-mechanical quantities to classical quantities by taking expectation values using quantum-mechanical equations, and explained the algorithm for the classical quantities using FIGS. 1 and 2. Because a major object of Embodiment 1 was to describe the basic algorithm, the description was provided without including quantum-mechanical effects. However, if quantum mechanical effects are added, an improvement in the success probability of solutions or an improvement in computation speed can be expected. Thus, Embodiment 2 describes a method of adding correction parameters based on quantum mechanics to improve computing performance, even though the algorithm itself is classical.

The characteristics of quantum mechanics include a linear superposition state and quantum entanglement (non-local correlation). For example, let us consider a qubit that takes the two states of $|0\rangle$ and $|1\rangle$. A linear superposition state is a sum state like $|\Psi\rangle=\alpha|0\rangle+\beta|1\rangle$. The attribute of the linear superposition state has already been incorporated through the vectorial treatment of spins in Embodiment 1. That is, if $s_j^z(t_k)=1$, the state is $|0\rangle$, and if $s_j^z(t_k)=-1$, the state is $|1\rangle$; $|0\rangle$ and $|1\rangle$ correspond to a state in a case in which the z-axis is selected as the quantization axis for spins; for $s_j^x(t_0)=1$ corresponding to an x-directed spin, the state is expressed with $|\psi(t_0)\rangle=(|0\rangle+|1\rangle)/\sqrt{2}$; and if $s_j^x(t)=-1$, the state is $|\psi(t_0)\rangle=(|0\rangle-|1\rangle)/\sqrt{2}$. Considering the x-axis means considering the linear superposition.

In the present embodiment, we describe the quantum entanglement that is another quantum mechanical effect. Let us consider a state in a two-qubit system described with $|\Psi\rangle=\alpha|00\rangle+\beta|11\rangle$ as an example. $|\alpha|^2+|\beta|^2=1$ is satisfied due to the normalization condition. The first and second variables in $|00\rangle$ and $|11\rangle$ are the first and second qubits, respectively. Because of $\hat{\sigma}_j^z|0\rangle=|0\rangle$ and $\hat{\sigma}_j^z|1\rangle=-|1\rangle$ based on a property of the Pauli spin matrix, $\hat{\sigma}_1^z|\psi\rangle=\alpha|00\rangle-\beta|11\rangle$, and thus $\langle\Psi|\hat{\sigma}_1^z|\Psi\rangle=|\alpha|^2-|\beta|^2$ is obtained. Similarly, because of $\hat{\sigma}_1^x|0\rangle=|1\rangle$ and $\hat{\sigma}_1^x|1\rangle=|0\rangle$, $\hat{\sigma}_1^x|\Psi\rangle=\alpha|10\rangle+\beta|01\rangle$, and thus $\langle\Psi|\hat{\sigma}_1^x|\Psi\rangle=0$ is obtained. Furthermore, because of $\hat{\sigma}_1^y|0\rangle=i|1\rangle$ and $\hat{\sigma}_1^y|1\rangle=-i|0\rangle$, $\hat{\sigma}_1^y|\Psi\rangle=i\alpha|10\rangle-i\beta|01\rangle$, and thus $\langle\psi|\hat{\sigma}_1^y|\Psi\rangle=0$ is obtained. Therefore, $\langle\hat{\sigma}_1^x(\tau)\rangle^2+\langle\hat{\sigma}_1^y(\tau)\rangle^2\langle\hat{\sigma}_1^z(\tau)\rangle^2=(|\alpha|^2-|\beta|^2)^2$. As an extreme example, when $\alpha=\beta$ corresponding to the maximum quantum entanglement, then $\langle\hat{\sigma}_1^x(\tau)\rangle^2+\langle\hat{\sigma}_1^y(\tau)\rangle^2+\langle\hat{\sigma}_1^z(\tau)\rangle^2=0$. The magnitude of the first spin vector is zero. Such a case does not occur if there is no quantum entanglement. For example, let us consider a one-spin system, and let us assume a state $|\Psi\rangle=\alpha|0\rangle+\beta|1\rangle$. Because $\langle\Psi|\hat{\sigma}_1^z|\Psi\rangle=|\alpha|^2-|\beta|^2$, $\langle\Psi|\hat{\sigma}_1^x|\Psi\rangle=\alpha^*\beta+\alpha\beta^*$, and $\langle\Psi|\hat{\sigma}_1^y|\Psi\rangle=i\alpha\beta^*-i\alpha^*\beta$, $\langle\hat{\sigma}_1^x(\tau)\rangle^2+\langle\hat{\sigma}_1^y(\tau)\rangle^2+\langle\hat{\sigma}_1^z(\tau)\rangle^2=(|\alpha|^2+|\beta|^2)^2=1$ is satisfied, and the magnitude is retained as 1.

As described above, although this is one example, it is understood that when quantum entanglement is present, the magnitude of the spin vector is not retained as 1. Although the magnitude of the spin vector is a fixed value of 1 in classical systems, if there is quantum entanglement, the magnitude of the spin vector is not 1. In Embodiment 1, based on the assumption that the magnitude of the spin vector is 1, a parameter $\theta$ was defined with $\tan\theta=\langle B_j^z(t)\rangle/\langle B_j^x(t)\rangle$, and a spin was described with $s_j^z(t_k)=\sin\theta$ and $s_j^x(t_k)=\cos\theta$. However, this method does not reflect the property of the quantum entanglement inherent in this system. Thus, let us consider how the quantum entanglement is reflected.

As described above, the spin vector is not retained as 1. Hence, let us define a correction parameter $r_s$ ($0\le r_s\le 1$) that represents the magnitude of the spin vector. Here, the proportional relationship in Equation (8) is not satisfied because the spin vector is not retained as 1. For this reason, a correction parameter $r_B$ is defined, and Equation (8) is modified. Equation (11) represents a modified form of Equation (8).

$$s_j^z(t_k)/s_j^x(t_k)=r_B B_j^z(t_k)/B_j^x(t_k) \quad \text{[Equation 11]}$$

Let us define an angle $\theta$ representing the orientation of the spin with $\tan\theta=s_j^z(t_k)/s_j^x(t_k)$ as similar to the case of Embodiment 1. When this is substituted into Equation (11), $\tan\theta=r_B\cdot B_j^z(t_k)/B_j^x(t_k)$ is obtained. Because the magnitude of the spin is $r_s$, $s_j^z(t_k)=r_s\cdot\sin\theta$ and $s_j^x(t_k)=r_s\cdot\cos\theta$ are obtained. With these relational equations, the effects of the quantum entanglement are incorporated into the classical algorithm through the correction parameters $r_s$ and $r_B$. If the equations are written without using $\theta$, then $s_j^z(t_k)=r_s\cdot\sin(\arctan(r_B\cdot B_j^z(t_k)/B_j^x(t_k)))$ and $S_j^x(t_k)=r_s\cdot\cos(\arctan(r_B\cdot B_j^z(t_k)/B_j^x(t_k)))$. Furthermore, if $r_s$ and $r_B$ are incorporated into functions $f_1$ and $f_2$, then $s_j^z(t_k)=f_1(B_j^z(t_k), t_k)$ and $s_j^x(t_k)=f_2(B_j^z(t_k), t_k)$.

These parameters $r_s$ and $r_B$ are originated in quantum entanglement. It is preferable that they are finely controlled depending on $t_k$, $s_j^z(t_k)$, and $s_j^x(t_k)$, or $t_k$, $B_j^z(t_k)$, and $B_j^x(t_k)$. However, it is difficult to accurately acquire information related to the quantum entanglement in principle, and we need to consider any method to cope with this difficulty. Actually, the parameters will be determined semi-empirically depending on the problem, but a general determination method is as follows.

$r_B$ can change its sign and reflects quantum entanglement most effectively. On the other hand, $r_s$ is a correction factor satisfying $0\le r_s\le 1$, and has a smaller role than $r_B$. Therefore, $r_s$ may be set to be approximately equal to 1 over a total computation time, and the quantum effect is mainly incorporated through $r_B$. Because there is no quantum entanglement at the beginning of the computation, $r_B=1$ is set at t=0, and $r_B$ is set to gradually approach zero at t>0. Most of the spins converge to $s_j^z=1$ or $-1$ near $t=\tau$, but some of the spins behave vaguely about whether $s_j^z>0$ or $s_j^z>0$. It is those poor-convergence spins that determine whether the computation succeeds or not. Therefore, when t approaches $\tau$, $r_B$ is determined to be optimal for those spins. Because the effect of the quantum entanglement should be incorporated to the maximum, $r_B$ is set to be nearly zero. Because the orientation of the spins that converge to $s_j^z=1$ or $-1$ is stable, setting nearly zero does not lead to many adverse results.

So far, we have described a method to make $r_B$ time-dependent. It is also effective to make $r_B$ magnetic-field-dependent. When $B_j^z(t_k)/B_j^x(t_k)$ is nearly equal to zero, $s_j^z(t_k)/s_j^x(t_k)$ is necessarily indefinite. Therefore, let $B_j^z(t_k)/B_j^x(t_k)=B_{zx}$ and let $r_B=r_B(B_{zx})$; it is effective to make $r_B$ magnetic-field-dependent as $r_B(\text{"}B_{zx}\text{ is nearly equal to zero"})<r_B(\text{"}|B_{zx}|\gg 0\text{"})$ at all times t.

When there is no specific feature between sites, $r_s$ and $r_B$ should not be site-dependent, but when site-dependent features are known in advance, $r_s$ and $r_B$ should be site-dependent in accordance with the features. This will lead to an improvement in the success probability of solutions.

FIG. 3 illustrates a flowchart where $r_s$ and $r_B$ are introduced. The differences between the flowcharts in FIGS. 2 and 3 is that steps 103, 105, and 107 are changed to steps 103a, 105a, and 107a, respectively, which includes the correction parameters $r_s$ and $r_B$.

Embodiments 3

In Embodiments 1 and 2, we have described the principle of the computation and the computation algorithm. In Embodiment 3, we will describe an example in which an apparatus is configured such that it is able to run the algorithm.

FIG. 4 illustrates an example of a configuration of a computing apparatus according to the present embodiment. The configuration in FIG. 4 is similar to that of an ordinary computing apparatus, but it includes a local-field response computing device 1000. The local-field response computing device 1000 specializes in the computation described in Embodiments 1 and 2, and other general computation is performed in a general computing device 202.

The configuration described above can be constructed from a single computer, or it can be constructed from different computers connected through a network, in which arbitrary parts, such as a main memory device 201, a general computing device 202, a control device 203, an auxiliary storage device 204, an input device 205, or an output device 206, are placed on those different computers.

General computation is performed in the same manner as in an ordinary computing apparatus; data are transmitted and received between the main memory device 201 that is a storage unit and the general computing device 202 that is a computing unit; and the computation is executed by repeating the procedure. Here, the computation is controlled by the control device 203 that is a control unit. A program executed in the general computing device 202 is stored in the main memory device 201 that is the storage unit. When the main memory device 201 has an insufficient memory capacity, the auxiliary storage device 204 that is similarly a storage unit is used.

Furthermore, parameters that are necessary for a cross computing unit, an individual-computing unit, and a switch unit, which will be described below, are stored in the main memory device 201 and the auxiliary storage device 204 as well. The input device 205 is used for inputting data, a program, and the like, and the output device 206 is used for outputting results. For the input device 205, not only a manual input device such as a keyboard but also an interface for a network connection can be used. Furthermore, the interface serves as the output device as well.

The local-field response computation, as described in Embodiments 1 and 2 (FIGS. 2 and 3), is executed by repeatedly calculating N spin variables $s_j^z(t)$ and N effective magnetic field variables $B_j^z(t)$ in a predetermined order of $s_j^z(t_{k-1})$-to-$B_j^z(t_k)$ and $B_j^z(t_k)$-to-$s_j^z(t_k)$. This repeated computation is executed inside the local-field response computing device 1000.

FIG. 5 illustrates the main parts inside the local-field response computing device 1000. The cross computing unit 1020 executes the computation of $s_j^z(t_{k-1})$-to-$B_j^z(t_k)$ and the individual-computing unit 1030 executes the computation of $B_j^z(t_k)$-to-$s_j^z(t_k)$.

The computation of $B_j^z(t_k)$-to-$s_j^z(t_k)$ was expressed as $s_j^z(t_k)=f_1(B_j^z(t_k), t_k)$ in Embodiments 1 and 2. As described in Embodiments 1 and 2, the function $f_1$ is a rather complicated function that includes trigonometric functions, but because the computation is executed independently site-by-site, the individual-computing unit 1030 can perform parallel processing about N sites. Parameters, such as $r_s$ and $r_B$, that are necessary in the function flare stored in the main memory device 201. They are transferred to the individual-computing unit 1030 according to an instruction of the control device 203.

The computation of $s_j^z(t_{k-1})$-to-$B_j^z(t_k)$ is based on Equation (10). In order to determine each $B_j^z(t_k)$, $s_j^z(t_{k-1})$ at every site i that satisfies $J_{ij}\neq 0$ is used. In the cross computing unit 1020, calculations of $B_1^z(t_k)$, $B_2^z(t_k)$, ..., $B_N^z(t_k)$ are performed in this order. $s_i^z(t_{k-1})$, which is needed in calculations, is temporarily stored in a buffer 1040, and only necessary $s_i^z(t_{k-1})$ is transferred from the buffer 1040 to the cross computing unit 1020 through the switch unit 1010. Information on $J_{ij}$ is stored in the main memory device 201, and in accordance with this $J_{ij}$-related-information, on/off switching and the computation in the cross computing unit 1020 is performed. The computation is controlled by the control device 203. The $B_j^z(t_k)$ which was obtained is transferred to the individual-computing unit 1030, and now one cycle of the repetitive computation has been accomplished.

In the present embodiment, it is ideal if we can arbitrarily set all interactions in N spin systems. If we intend N spins to operate simultaneously to achieve high-speed computation, the number of switches which may be used for arbitrarily setting the interactions is enormous. On the other hand, there is a need to reduce the number of switches in order to manufacture practical computing apparatuses. However, manufacturing computers with a reduced number of switches comes at the expense of high speed. That is, there is a trade-off between high speed and a reduction in the number of switches. Nevertheless, this issue is solved by separating the computing unit into the cross computing unit 1020 and the individual-computing unit 1030, and by performing pipeline processing in the cross computing unit.

The cross computing unit is configured to be able to perform pipeline processing, and the individual-computing unit is configured to be able to independently calculate N variables. Thus, both units can perform high-speed computing. Moreover, because the cross computing unit performs the pipeline processing, the number of switches is reduced. Thus, high speed and a reduction in the number of switches are both achieved.

FIG. 6 is a diagram that further describes the inside of the local-field response computing device 1000 in detail. The computation inside the cross computing unit 1020 simply consists of the multiplication $J_{ij}\times s_i^z$ and the sum $\Sigma_i J_{ij} s_i^z + g_j$. As illustrated in FIG. 6, the calculation of $\Sigma_i J_{ij} s_i^z$ consists of adding two terms in pairs, and $g_j$ is added last. The switch unit 1010 transfers only the quantity $s_i^z$ necessary for calculating $\Sigma_i J_{ij} s_i^z + g_j$ based on $J_{ij}\neq 0$ from the buffer 1040 to the cross computing unit 1020. $s_i^z$ is a continuous quantity of $[-1, 1]$, and if $s_i^z$ is digitally treated, it is a multi-bit variable. The computation inside the cross computing unit 1020 consists of only multiplication and summation. Therefore, even in multi-bit computation, if the processing begins at the least significant bit (LSB), it can be simply performed in a time-series manner, including carrying bits. That is, the cross computing unit 1020 can perform the pipeline processing. When $B_1^z(t_k)$, $B_2^z(t_k)$, ..., $B_N^z(t_k)$ are calculated in this order, the processing for $B_2^z(t_k)$ can be started before the processing of $B_1^z(t_k)$ is completed.

FIG. 7 illustrates processing on the time-axis.

The local-field response method achieves the highest speed if N $s_i^z$'s can be processed in parallel. Because the individual-computing unit 1030 independently performs the computation for each site j, parallel processing is possible. The computation inside the cross computing unit 1020 is also semi-parallel owing to the pipeline processing as apparent from FIG. 7. Therefore, the high-speed performance is maintained sufficiently. Besides, the number of switches in the switch unit 1010 can be reduced to the requisite minimum, because the processing for $B_1^z(t_k)$, $B_2^z(t_k)$, ..., $B_N^z(t_k)$ is performed in a time-series manner. Thus, the high-speed performance of the computation and the reduction in the number of switches are simultaneously achieved.

Moreover, if a plurality of cross computing units 1020 are arranged, the degree of parallelism further increases.

FIG. 8 illustrates a configuration diagram in such a case. As the degree of parallelism increases, the number of necessary switches increases. An actual configuration is determined by taking the cost into consideration.

The present embodiment so far has described the cross computing unit 1020 and the individual-computing unit 1030 from the viewpoints of principal constituents. Now let us see the repetitive computation described above from the perspective of a transmission path (see FIG. 6). The computation is independently performed for each site j inside the individual-computing unit 1030, and a value of $s_j^z$ is transferred (transmitted) to the buffer 1040 site-by-site. In the successive processes in the buffer 1040, the switch unit 1010, the cross computing unit 1020, and the individual-computing unit 1030, only values of s z that are necessary for calculating $B_j^z$ for each site j are selected. When $B_1^z$ is calculated, only information related to $B_1^z$ is transferred (transmitted); when $B_2^z$ is calculated, only information related to $B_2^z$ is transferred (transmitted). Thereafter, $B_3^z$, $B_4^z$, $B_5^z$, . . . are similarly treated. That is, a transmission path for a calculation process is shared in the calculation of $B_j^z$. In other words, it can be said that $B_j^z$ is calculated using a multiplexed transmission path. In the present embodiment, $B_j^z$ is calculated with the pipeline processing, and therefore, this is an example of time division multiplexing.

The local-field response computing device 1000 may be configured as a one-chip co-processor (sub-processing device), for example, and it is added to a configuration of an ordinary computer. It is achieved as a hardware configuration in FIG. 4. Alternatively, the switch unit 1010, the cross computing unit 1020, and the individual-computing unit 1030 may be achieved as individual chips. The local-field response computing device 1000 may be configured with a dedicated hardware or may be configured with a hardware, such as a Field Programmable Gate Array (FPGA) or an Application Specific Integrated Circuit (ASIC). In such hardware, the cross computing unit 1020 can perform the pipeline processing for $B_1^z$, $B_2^z$, $B_2^z$, . . . in this order as described above, and the computation of each $B_j^z$ is processed in parallel.

Embodiment 4

Because $s_i^z$ is a continuous quantity of $[-1, 1]$ and the computation inside the cross computing unit 1020 is a simple computation consisting of only multiplication and summation, it is also effective to perform the computation inside the cross computing unit 1020 using analog computation on a time-axis.

FIG. 9 illustrates a configuration example in such a case. A DT conversion unit 1045 is installed on the output side of the buffer 1040, and a multi-bit digital value is converted into a time-direction analog value.

FIG. 10 illustrates an image diagram in which a multi-bit digital value is converted into a time-direction analog value. The time-direction analog value, as illustrated in FIG. 10, is expressed with a time position at which a voltage rises. When a voltage is used as an analog value, it is difficult to precisely control the value due to various voltage drops which occur. However, if the analog value is expressed with the time position, the value is resistant to various voltage drops and makes the analog computation relatively precise.

The multiplication and summation for the time-direction analog values are easy (NPL 4). The computation inside the cross computing unit 1020 is all performed in analog. Then, the time-direction analog values are converted into digital values in the TD conversion unit 1025, and the converted data are transferred to the individual-computing unit 1030.

Embodiment 5

As seen in Equation (1) and others described above, the computation time is assumed to be τ, but there are several methods of determining the final solution. Embodiment 5 describes the various methods of determining the solution.

FIGS. 11A to 11D are flow diagrams in the form of flowcharts, which illustrate various examples of algorithms related to the final-solution-determining methods according to the present embodiment.

In the first method, as illustrated in FIG. 11A, at $t=\tau(t=t_m)$ (115), if $s_j^z>0$, $s_j^{zd}=1$, and if $s_j^z<0$, $s_j^{zd}=-1$. The flowchart in FIGS. 2 and 3 for each embodiment illustrates this case. Accordingly, steps 101 of FIGS. 2 and 3 correspond to step 113 of FIG. 11A; steps 105 of FIG. 2 and steps 105a of FIG. 3 correspond to step 114 of FIG. 11A; step 107 of FIG. 2 and step 107a of FIG. 3 correspond to step 115 of FIG. 11A; and steps 108 and 109 of FIGS. 2 and 3 correspond to steps 108 and 109 of FIG. 11A respectively. The flowchart in FIG. 11A focuses only on a solution-determining method. The general computing device 202 is used to determine s z. Therefore, the values of $s_j^z$ are transferred from the buffer 1040 to the main memory device 201 (FIG. 5).

In the second method, the convergence of $s_j^z$ is checked as illustrated in FIG. 11B. If a sign of $s_j^z$ does not change (117, 118) at all times $t_q$ (116) over a sufficient time $\Delta t$ (121) after time $t_k$ (114), $s_j^{zd}=1$ or $-1$ (119, 120) is determined based on the sign of $s_j^z$ at the time point (122). This judgement is done in the general computing device 202. For this reason, the values of $s_j^z$ at each time are similarly transferred from the buffer 1040 to the main memory device 201.

In the third method, as illustrated in FIG. 11C, the computation continues until $t=\tau$ ($t=t_m$) (115) as similar to that in the first method. Energy at each stage is calculated based on Equation (3). The eigenvalue of $\hat{\sigma}_j^z$ in Equation (3) is ±1. Whether it is 1 or −1 is determined according to the sign of $s_j^z$ at each stage of the computation process. That is, if $s_j^z(t_k)>0$, the eigenvalue of $\hat{\sigma}_j^z$ is 1 ($s_j^{zd}=1$), and if $s_j^z(t_k)<0$, the eigenvalue of $\hat{\sigma}_j^z$ is −1 ($s_j^{zd}=-1$). It is the energy that is calculated with the eigenvalue of $\hat{\sigma}_j^z$, and the computing is processed using $s_j^z(t_k)$ ($-1 \leq s_j^z(t_k) \leq 1$). When $t=\tau$ ($t=t_m$) comes, the energy at every time $t_k$ is compared; the final solution is determined based on the sign of $s_j^z(t_{k'})$ at time $t_{k'}$ at which the lowest energy was obtained.

That is, at each time $t_k$, if $s_j^z(t_k)<0$, $s_j^{zd}(t_k)=-1$, and if $s_j^z(t_k)>0$, (117) $s_j^{zd}(t_k)=1$ (119); $H_p(t_k)=-\Sigma_{i>j}J_{ij}s_i^{zd}(t_k)s_j^{zd}(t_k)-\Sigma_j g_j s_j^{zd}(t_k)$ is calculated at each time $t_k$ (123); and the final solution is $s_j^{zd}(t_{k'})$ at time $t_{k'}$ at which $H_p(t_k)$ is minimum (124). Here, the calculation of the energy is performed with the general computing device 202. For this reason, the values of $s_j^z$ are transferred from the buffer 1040 to the main memory device 201.

In the fourth method, as illustrated in FIG. 11D, when all $s_j^z$'s converge, the computation is discontinued, similar to the second method. However, the final solution is not judged based on $s_j^z$ at the time point at which the computation was discontinued; similar to the third method, the energy is calculated at every time and a solution is determined by $s_j^z(t_{k'})$ at the time at which the lowest energy was given (125). Again, the calculation of the energy is performed with the general computing device 202, and therefore, the values of $s_j^z$ are transferred from the buffer 1040 to the main memory device 201 as well.

A user determines which of the methods to use.

Embodiment 6

We have described embodiments in which the time-axis is discretely treated as illustrated in FIG. 1. Because a continuous change is ideal, a smaller time interval is more desirable. However, when the time interval is too small, the computation time is lengthened. For this reason, let us consider that the time interval is changed as the computation progresses.

The important time in the computation process is the time at which the sign of $s_j^z$ changes. The frequency of $s_j^z$'s changing the sign is relatively low near the starting and ending time in the computation. It is very high in the intermediate stage of the computation. Therefore, the first method of this embodiment is a setting method: the time interval is set to be large at the beginning of the computation as a program; next, the time interval is set to be small with the passage of time; and then the time interval is reversed and set to be large.

The second method is a method in which the probability that the spin will be inverted is evaluated at each time and the time interval is set based on the result of the evaluation. An example is as follows. When the magnitudes of $|s_j^z|$ are almost equal to each other in all spins, the probability of spin inversion is low. In this case, the time interval is set to be large. On the other hand, when the magnitude of of a specific spin is smaller than that of other spins, the probability of spin inversion is high. In this case, the time interval is set to be small. The following is a specific example of the method of determining the time interval. Let $\delta t_{min}$ be a minimum time interval. Let $s_{ave}(t_k)^2$ be the mean square of spins of all sites at time $t_k$, and let $s_{min}(t_k)^2$ be the magnitude of the square of the minimum spin. That is, $s_{ave}(t_k)^2=\Sigma_j(s_j^z(t_k))^2/N$ and $s_{min}(t_k)^2=\min(s_j^z(t_k)^2)$. Let [x] be the largest integer that is equal to or smaller than x. Let $\Delta T_{k+1, k}=t_{k+1}-t_k=\delta t_{min} \times \max(1, [100\times(s_{min}(t_k)^2/s_{ave}(t_k)^2)^{1/2}])$. In this case, the minimum value of the time interval is $\delta t_{min}$, and the maximum value thereof is $100 \cdot \delta t_{min}$. The calculation for determining the time interval is performed using the general computing device 202.

A user determines which of the methods to use.

In the present embodiments, the influence of temperature is estimated as follows. A voltage necessary for bit inversion is of the order of 1 V. Let e be the elementary charge and let $k_B$ be the Botzmann's constant. The reduced temperature T is about $1.2 \times 10^4$ K due to $T=eV/k_B$. This value is sufficiently higher than a room temperature of 300 K. Thus, the influence of temperature can be ignored in a configuration like that in the present embodiments, and the apparatus can operate at room temperature.

The present invention is not limited to the embodiments described above, and includes various modified embodiments. For example, one or more configurations in a certain embodiment may be replaced by one or more configurations in other embodiments, and one or more configurations of other embodiments may be added to one or more configurations of other embodiments. Moreover, a configuration in some embodiments may be added to, deleted from, or replaced by one portion of a configuration in each embodiment.

INDUSTRIAL APPLICABILITY

The present invention is applicable to analyzing various kinds of data such as Big Data.

REFERENCE SIGNS LIST 100 procedure
201 main memory device
202 general computing device
203 control device
204 auxiliary storage device
205 input device
206 output device
1000 local-field response computing device
1110 switch unit
1120 cross computing unit
1025 TD conversion unit
1130 individual-computing unit
1140 buffer
1045 DT conversion unit

The invention claimed is:
1. A quantum computing apparatus comprising one or more computers connected through a network configured to perform computation for problems requiring exhaustive search, wherein the quantum computing apparatus is operational at room temperature and comprises:
  a main memory configured to store computation programs and one or more variables that will be used for executing local-field response computation, including one or more correction parameters;
  a processor configured to execute the one or more programs stored in the main memory; and
  a co-processor configured to execute local-field response computation over a calculation period τ, wherein local field response computation comprises repetitively calculating N spin variables $s_j^z(t)$ and N effective magnetic field variables $B_j^z(t)$ in a predetermined order, wherein "t" represents a point in time in the calculation period τ, and "z" represents the z-axis, and wherein the co-processor alternates between calculating a spin variable of the N spin variables and a magnetic field variable of the N magnetic field variables until it has determined each of the N spin variables and N magnetic field variables over the calculation period τ, the co-processor comprising:
    a pipeline processor configured to perform multiplication and summation computation in a time-series manner as part of the local-field response computation, wherein the pipeline processor executes computation of, in which k is an index of t and specifies a point in time in calculation period τ, i and j represent spin sites, and $J_{ij}$ and $g_j$ are parameters for setting a problem, wherein $J_{ij}$ represents the value of an inter-variable interaction based on information stored in the main memory, and wherein the $B_j^z(t_k)$ is calculated by using $s_i^z(t_{k-1})$ at every site i where $J_{ij}$ is not equal to 0,
    a parallel processor configured to perform parallel processing about N sites as part of the local-field response computation, wherein the parallel processor executes computation of $s_j^z(t_k)=f_1(B_j^z(t_k), t_k)$, wherein $f_1$ is defined according to the following equation: $f_1(B_j^z(t_k), t_k)=\sin(\arctan(B_j^x(t_k)/B_j^z(t_k))$, wherein "z" represents the z-axis and "x" represents the x axis,
    a buffer configured to temporarily store N spin variables $s_j^z(t)$,
    one or more electrical switches configured to transfer the N spin variables $s_j^z(t)$ temporarily stored in the buffer to the pipeline processor.

2. The quantum computing apparatus according to claim 1,
wherein in the pipeline processor, N effective magnetic field variables $B_1^z, B_2^z, B_N^z$ are calculated sequentially in an order starting from $B_1^z$ and ending at $B_N^z$ by performing pipeline processing, using the N spin variables $s_j^z$ that are stored in the buffer.

3. The quantum computing apparatus according to claim 1, wherein the spin variables $s_j^z$ and effective magnetic field variables $B_j^z$ are composed of multi-bits.

4. The quantum computing apparatus according to claim 1, wherein the spin variables $s_j^z$ are configured with multi-bits, and the N $s_j^z$'s that are stored in the buffer are transferred using the one or more electrical switches beginning at the least significant bit (LSB), wherein the processing of $s_j^z$ in the pipeline processor is performed beginning with the LSB and is performed in a time-series manner.

5. The quantum computing apparatus according to claim 1,
wherein when the N $s_j^z$'s stored in the buffer are transferred to the one or more electrical switches, $s_j^z$ is set to be a time-direction analog value, and $s_j^z$ is processed in analog format when it is processed in the pipeline processor.

6. The quantum computing apparatus according to claim 1,
wherein the N spin variables $s_j^z$ (j=1, 2, . . . , N) take a range of $-1 \le s_j^z \le 1$, and an assignment is set with local fields $g_j$ and inter-variable interactions $J_{ij}$ (i, j=1, 2, . . . , N),
wherein in the co-processor, computing is discretely performed from $t=t_0$ ($t_0=0$) to $t_m$ ($t_m=\tau$),
wherein in calculating variables $s_j^z(t_k)$ at each time $t_k$, $B_j^z(t_k)=\{\Sigma_i J_{ij} s_i^z(t_{k-1})+g_j\} \cdot t_k/\tau$ is calculated using values of variables $s_i^z(t_{k-1})$ (i=1, 2, . . . , N) at time $t_{k-1}$ that is earlier than time $t_k$, $s_j^z(t_k)$ is determined as $s_j^z(t_k)=f_1(B_j^z(t_k), t_k)$, where the function $f_1$ is defined in such a manner that the range of $s_j^z(t_k)$ is $-1 \le s_j^z(t_k) \le 1$, and
wherein as a time step proceeds from $t=t_0$ to $t=t_m$, $s_j^z$ approaches -1 or 1, and a final solution $s_j^{zd}$ is determined, wherein if $s_j^z<0$, then $s_j^{zd}=-1$, and if $s_j^z>0$, then $s_j^{zd}=1$.

7. The quantum computing apparatus according to claim 6, wherein correction parameters $r_s$ and $r_B$ are added, and $\theta$ is defined as an angle representing the orientation of a spin by $\tan\theta=r_B \cdot B_j^z(t_k)/B_j^x(t_k)$, wherein $s_j^z(t_k)$ is determined by $s_j^z(t_k)=r_s \cdot \sin\theta$, and therefore the function $f_1$ is $f_1(B_j^z(t_k), t_k)=r_s \cdot \sin(\arctan(r_B \cdot B_j^z(t_k)/B_j^x(t_k)))$.

8. The quantum computing apparatus according to claim 6, wherein at each time $t_k$, if $s_j^z(t_k)<0$, $s_j^{zd}(t_k)=-1$ is set, and if $s_j^z(t_k)>0$, $s_j^{zd}(t_k)=1$ is set, $H_p(t_k)=-\Sigma_{i>j} J_{ij} s_i^{zd}(t_k) s_j^{zd}(t_k)-\Sigma_j g_j s_j^{zd}(t_k)$ is calculated at each time $t_k$, with the computation continuing until $t=t_m$, wherein $H_p$ represents a Hamiltonian of a physical system, and the final solution is $s_j^{zd}(t_{k'})$ at time $t_{k'}$, at which $H_p(t_k)$ is minimum as $H_p(t_{k'})=\min[H_p(t_k)]$.

9. The quantum computing apparatus according to claim 6, wherein computation performed in the pipeline processor uses analog computation on a time-axis, wherein a digital-to-time converter is installed on the buffer, and a multi-bit digital value is converted into a time-direction analog value.

10. The quantum computing apparatus according to claim 1, wherein the correction parameters include $r_s$, which represents the magnitude of a spin, and $r_B$, which represents an effect of quantum entanglement.

11. The quantum computing apparatus according to claim 1,
wherein the quantum computing apparatus is configured to be constructed on a single computer.

12. The quantum computing apparatus according to claim 1,
wherein the quantum computing apparatus is configured to be constructed on different computers connected through the network, wherein each of the main memory, the processor, the pipeline processor, and the parallel processor are placed on different computers in the network.

13. The quantum computing apparatus according to claim 1,
wherein the co-processor is configured as a one-chip co-processor (sub-processing device), and wherein the co-processor is added to a configuration of a non-quantum computer.

14. The quantum computing apparatus according to claim 1,
wherein the co-processor is configured with a Field Programmable Gate Array (FPGA).

15. The quantum computing apparatus according to claim 1,
wherein the co-processor is configured with an Application Specific Integrated Circuit (ASIC).

* * * * *